United States Patent
Carlson

(10) Patent No.: US 11,641,117 B2
(45) Date of Patent: May 2, 2023

(54) ELECTRONIC DEVICES WITH MULTIPLE ENERGY STORAGE DEVICE CHARGING CIRCUITS AND CORRESPONDING METHODS

(71) Applicant: Motorola Mobility LLC, Chicago, IL (US)

(72) Inventor: Mark Carlson, Arlington Heights, IL (US)

(73) Assignee: Motorola Mobility LLC, Chicago, IL (US)

(*) Notice: Subject to any disclaimer, the term of this patent is extended or adjusted under 35 U.S.C. 154(b) by 280 days.

(21) Appl. No.: 17/170,673

(22) Filed: Feb. 8, 2021

(65) Prior Publication Data
US 2022/0255326 A1    Aug. 11, 2022

(51) Int. Cl.
*H02J 7/00* (2006.01)
*G06F 1/16* (2006.01)
(Continued)

(52) U.S. Cl.
CPC .......... *H02J 7/0019* (2013.01); *G06F 1/1652* (2013.01); *G06F 1/1683* (2013.01); *H02J 7/0013* (2013.01); *H02J 7/0045* (2013.01); *H02J 7/00304* (2020.01); *H02J 7/007182* (2020.01); *H02J 7/007184* (2020.01); *H02J 50/00* (2016.02); *G06F 1/1641* (2013.01);
(Continued)

(58) Field of Classification Search
CPC ...... H02J 7/0013; H02J 7/0014; H02J 7/0019; H02J 7/00304; H02J 7/0045; H02J 50/00; H02J 2310/22; G06F 1/1641; G06F 1/1652; G06F 1/1683

USPC ................. 320/107, 151, 156, 161
See application file for complete search history.

(56) References Cited

U.S. PATENT DOCUMENTS

2011/0156636 A1* 6/2011 Kim ................. H02J 50/70
                                                            320/108
2011/0248681 A1   10/2011 Miller et al.
(Continued)

FOREIGN PATENT DOCUMENTS

WO    2020248999    12/2020

OTHER PUBLICATIONS

Gill, Edward, "GB Search Report", GB2200765.2; dated Jul. 5, 2022.
(Continued)

*Primary Examiner* — Zixuan Zhou
(74) *Attorney, Agent, or Firm* — Philip H. Burrus, IV

(57) ABSTRACT

An electronic device included a first energy storage device coupled to a second energy storage device by a conductor. A charging node is coupled to the first energy storage device. Another conductor couples the charging node to the second energy storage device. A switch is electrically coupled between the conductor and the second energy storage device. A control circuit opens the switch, thereby allowing a first charging current to flow from the charging node to the first energy storage device through the conductor and a second charging current to flow from the charging node to the second energy storage device through the other conductor and closes the switch when a difference between a voltage of the first energy storage device and a voltage of the second energy storage device is within a predefined voltage difference threshold.

20 Claims, 9 Drawing Sheets

(51) Int. Cl.
   *H02J 50/00*    (2016.01)
   *H02J 50/20*    (2016.01)
(52) U.S. Cl.
   CPC .............. *H02J 7/0014* (2013.01); *H02J 50/20* (2016.02); *H02J 2310/22* (2020.01)

(56)  References Cited

U.S. PATENT DOCUMENTS

| | | | |
|---|---|---|---|
| 2013/0329327 A1* | 12/2013 | Zara | H02H 3/207 |
| | | | 361/86 |
| 2019/0214831 A1 | 7/2019 | Kristjansson et al. | |
| 2020/0395765 A1 | 12/2020 | Kristjansson et al. | |

OTHER PUBLICATIONS

"LG BL-T46 Battery", LG V60 model; Found at https://www.batteryclub.org/Goods/ECN11813_TE-BL-T46-Lg-Battery.html ; Unknown exact public availability date but prior to filing of present application.

"Microsoft Surface Duo—Exclusive Look Inside Dual-Screen Design", Published Aug. 12, 2020; View at minute 1:14 of 8:31. Viewed Feb. 15, 2021 at https://www.youtube.com/watch?v=9Pybi_OZVBA.

Gurries, Mark , "Monolithic Dual Battery Power Manager Increases Run Time and Decreases Charge Time", Published on Analog.com and originally in Dec. 2001 in Linear Technology Magazine.

"Implementation Diagram—TurboMod Battery", Picture of Inventor Provided Prior Art for U.S. Appl. No. 17/170,673; Unknown Publication Date but prior to filing of present application.

* cited by examiner

ELECTRONIC DEVICES WITH MULTIPLE ENERGY STORAGE DEVICE CHARGING CIRCUITS AND CORRESPONDING METHODS

BACKGROUND

Technical Field

This disclosure relates generally to electronic devices, and more particularly to electronic devices having multiple energy storage devices.

Background Art

Portable electronic devices such as smartphones, laptop computers, tablet computers, and two-way radios derive their portability from energy storage devices, one example of which is a rechargeable electrochemical cell. In some situations, an electronic device will include two or more rechargeable cells that are coupled together in serial or in parallel. When the energy stored within the rechargeable cells becomes depleted, it is necessary to attach a power supply to the electronic device to recharge the cells.

Where circuit impedances between the rechargeable cells is non-trivial, such impedances can cause voltage drops during charging that effectively derate the maximum usable capacity from the overall energy storage system. In some situations, minimizing these circuit impedances is difficult due to the physical constraints associated with a design for a particular application. It would be advantageous to have improved charging circuits for electronic devices having multiple energy storage devices, as well as methods of charging these energy storage devices, that reduce these adverse effects on charging performance.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
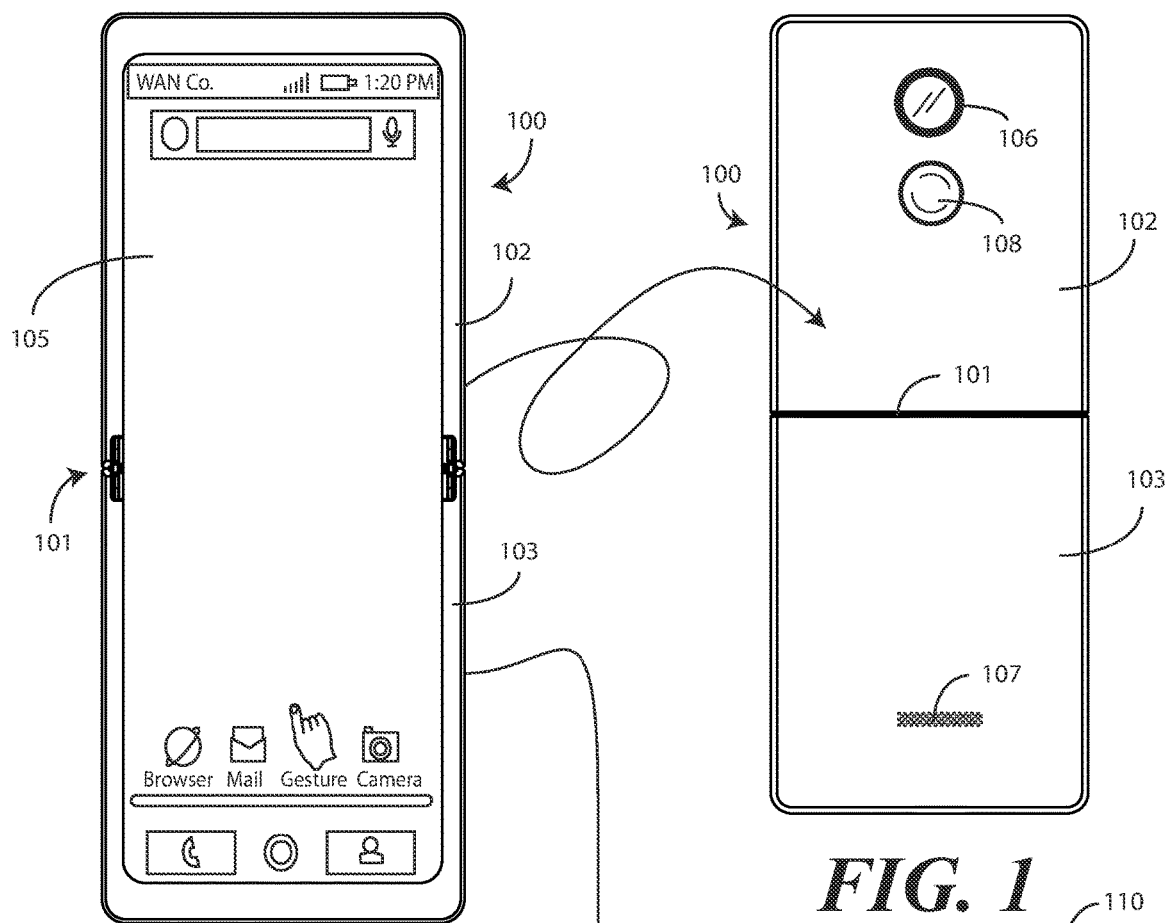
FIG. 1 illustrates one explanatory electronic device in accordance with one or more embodiments of the disclosure.
Figure 1:
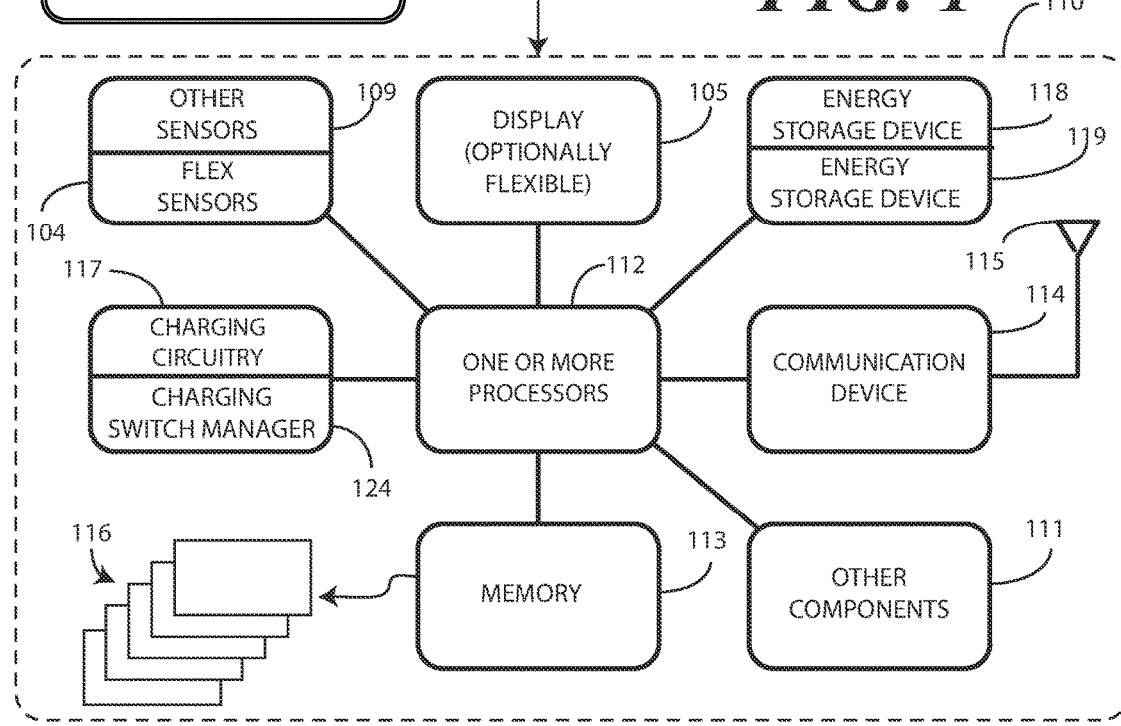

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to charging multiple energy storage devices, one example of which is an electrochemical cell, situated in an electronic device. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or charging technology, improve the functioning of the electronic device itself by and improving the performance that can be achieved from a multiple energy storage device system in which non-zero impedances occur in circuit components coupling one energy storage device to another.

It will be appreciated that embodiments of the disclosure described herein may be comprised of one or more conventional processors and unique stored program instructions that control the one or more processors to implement, in conjunction with certain non-processor circuits, some, most, or all of the functions of opening a switch electrically coupled between a conductor coupling a first energy storage device to a second energy storage device and one of the energy storage devices while a difference between the voltages of the first energy storage device and the second energy storage device exceeds a threshold to temporarily charge the first energy storage device and the second energy storage in parallel as described herein. The non-processor circuits may include, but are not limited to, a control circuit, switches, overprotection circuits, fuel gauging circuits, diodes, signal drivers, clock circuits, power source circuits, and user input devices. As such, these functions may be interpreted as steps of a method to perform opening a switch coupled between a first energy storage device and a second energy storage device when the difference between the voltage of the first energy storage device and the second energy storage device exceeds a predefined voltage difference threshold, thereby allowing a first charging current to flow from a charging node through an electrical conductor to the first energy storage device while a second charging current flows from the charging node through another electrical conductor to the second energy storage device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide circuits and methods for charging electronic devices having multiple energy storage devices situated therein. In one or more embodiments, and electronic device comprises a first energy storage device coupled to a second energy storage device by a conductor. In one or more embodiments, the conductor has a non-trivial impedance associated therewith. For instance, in an explanatory embodiment used below for illustration purposes, the electronic device includes a first device housing coupled to a second device housing by a hinge such that the first device housing is pivotable about the hinge relative to the second device housing between an axially displaced open position and a closed position. In one or more embodiments, the first energy storage device is situated in the first device housing, while the second energy storage device is situated in the second device housing. A flexible conductor then spans the hinge and couples the first energy storage device and the second energy storage device in parallel so that they function as a singular energy storage device having an increased current capacity as a result of the parallel configuration.

In one or more embodiments, a charging node is coupled to the first energy storage device. Another conductor, which may be configured as another electrically conductive trace along the flexible substrate, couples the charging node to the second energy storage device.

In one or more embodiments, a switch is electrically coupled between the conductor coupling the first energy storage device and the second energy storage device and the second energy storage device itself. Opening the switch allows the connection provided by the conductor to be interrupted.

In one or more embodiments, a control circuit opens the switch when a difference between a voltage of the first energy storage device and another voltage of the second energy storage device exceeds a predefined voltage difference threshold. This allows the first energy storage device to be charged with current flowing from the charging node through the conductor, while the second energy storage device is charged with current flowing from the charging node through the other conductor. Thereafter, the control circuit closes the switch when the difference between the voltage of the first energy storage device and the voltage of the second energy storage device is within the predefined voltage difference threshold.

To allow cell balancing while the switch is opened, in one or more embodiments a current limiting conductor is coupled in parallel with the switch. In one or more embodiments, the current limiting conductor comprises a resistor coupled in parallel with the switch. In other embodiments, the current limiting conductor comprises a resistor coupled in series with another switch, with that serial combination being coupled in parallel with the first switch. In one or more embodiments, the control circuit can close the other switch when the difference between the voltage of the first energy storage device and the voltage of the second energy storage device exceeds the predefined voltage difference threshold and/or when the first switch is open. This advantageously allows the voltage of the first energy storage device and the voltage of the second energy storage device to come to equilibrium in a controlled manner.

Accordingly, embodiments of the disclosure provide a method of opening a switch coupled between a first energy storage device and an electrical conductor coupling the switch to a second energy storage device when a difference between a voltage of the first energy storage device and a voltage of the second energy storage device exceeds a predefined voltage difference threshold, thereby allowing a first charging current to flow from a charging node to the first energy storage device while a second charging current flows from the charging node to the second energy storage device through another conductor. When implemented in an electronic device having a first device housing coupled to a second device housing by a hinge, with the first energy storage device situated in the first device housing and the second energy storage device situated in the second device housing, a control circuit can open the switch when the difference between the voltage of the first energy storage device and the voltage of the second energy storage device exceeds the predefined voltage difference threshold, and then close the switch when the difference between the voltage of the first energy storage device and the voltage of the second energy storage device falls within the predefined voltage difference threshold.

Advantageously, embodiments of the disclosure allow the maximum charge current (as specified for each energy storage device) to be delivered to each energy storage device during charging. The net result is faster charging and a better user experience.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 could take any of a variety of shapes. For explanatory purposes, the electronic device 100 is illustrated as a deformable electronic device having a first device housing 102 and a second device housing 103 coupled together by a hinge 101. This construct is used for explanatory purposes herein because it provides an illustration of how an electrical conductor spanning the hinge can include higher impedances between circuit components, e.g., electrochemical cells, than may occur in other circuit configurations. For instance, when a first rechargeable cell is situated within the first device housing 102, with a second rechargeable cell situated in the second device housing 103, an electrical conductor spanning the hinge 101 to couple these rechargeable cells together may include an impedance that is on the order of milli-Ohms. When this occurs, any voltage drop across this impedance essentially derates the maximum usable capacity from the overall battery system defined by the rechargeable cells. While a deformable device is one explanatory situation in which design constraints may preclude simply using a conductor with a lower impedance, others will be obvious to those of ordinary skill in the art having the benefit of this disclosure. Accordingly, the electronic device 100 of FIG. 1 is illustrative only.

In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIG. 2, and an axially displaced open position, shown in FIG. 1 and described below with reference to FIG. 4.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure.

In the illustrative embodiment of FIG. 1, the electronic device 100 includes a single hinge. However, in other embodiments two or more hinges can be incorporated into the electronic device 100 to allow it to be folded in multiple locations.

This illustrative electronic device 100 of FIG. 1 includes a display 105. The display 105 can optionally be touch-sensitive. In one embodiment where the display 105 is touch-sensitive, the display 105 can serve as a primary user interface of the electronic device 100. Users can deliver user input to the display 105 of such an embodiment by delivering touch input from a finger, stylus, or other objects disposed proximately with the display 105.

In one embodiment, the display 105 is configured as an organic light emitting diode (OLED) display fabricated on a flexible plastic substrate, thereby making the display 105 a flexible display 105. This allows the display 105 to be flexible so as to deform when the first device housing 102 pivots about the hinge 101 relative to the second device housing 103. However, it should be noted that other types of displays suitable for use with the electronic device 100 will be obvious to those of ordinary skill in the art having the benefit of this disclosure. Illustrating by example, in other embodiments multiple displays can be used. For instance, a first rigid display can be coupled to the first device housing 102, while a second, separate rigid display can be coupled to the second device housing 103, with the hinge 101 separating the two displays.

Features can be incorporated into the first device housing 102 and/or the second device housing 103. Examples of such features include a camera 106 or an optional speaker port 107, which are shown disposed on the rear side of the electronic device 100 in this embodiment but could be placed on the front side as well. In this illustrative embodiment, a user interface component 108, which may be a button or touch sensitive surface, can also be disposed along the rear side of the first device housing 102. As noted, any of these features are shown being disposed on the rear side of the electronic device 100 in this embodiment, but could be located elsewhere, such as on the front side in other embodiments. In other embodiments, these features may be omitted.

A block diagram schematic 110 of the electronic device 100 is also shown in FIG. 1. The block diagram schematic 110 can be configured as a printed circuit board assembly disposed within either or both of the first device housing 102 or the second device housing 103 of the electronic device 100. Various components can be electrically coupled together by conductors or a bus disposed along one or more printed circuit boards. For example, as will be described below with reference to FIG. 6, some components of the block diagram schematic 110 can be configured as a first electronic circuit fixedly situated within the first device housing 102, while other components of the block diagram schematic 110 can be configured as a second electronic circuit fixedly situated within the second device housing 103. As will be described in more detail below with reference to FIGS. 5 and 7, a flexible substrate can then span the hinge 101 to electrically couple the first electronic circuit to the second electronic circuit.

In one or more embodiments, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

In this illustrative embodiment, the electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications such as HomeRF, Bluetooth and IEEE 802.11, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the electronic device 100. For example, in one embodiment the one or more processors 112 comprise one or more circuits operable with one or more user interface devices, which can include the display 105, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

Figure 2:
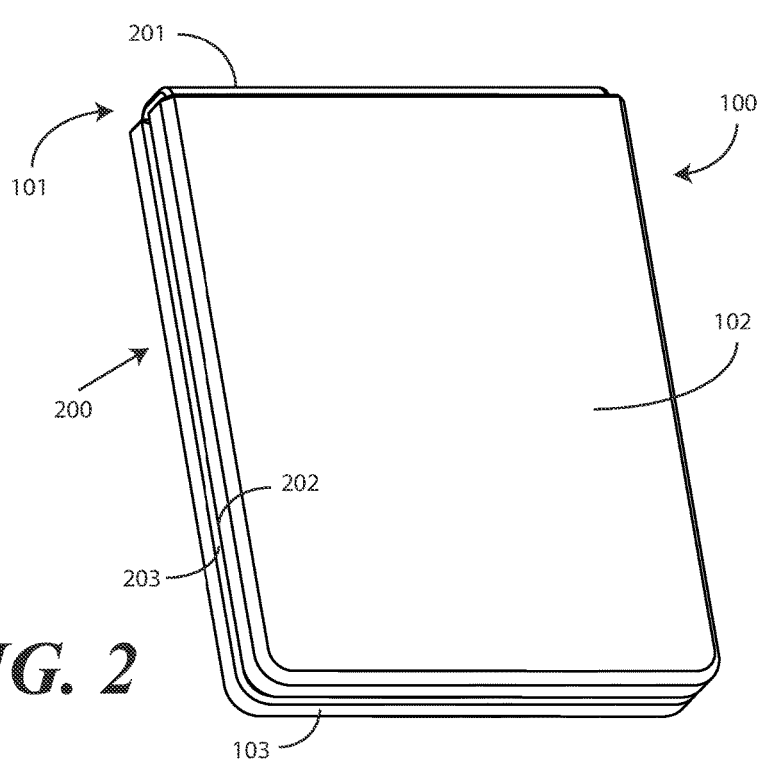
FIG. 2 illustrates a perspective view of one explanatory electronic device in accordance with one or more embodiments of the disclosure in a closed position.
Figure 3:
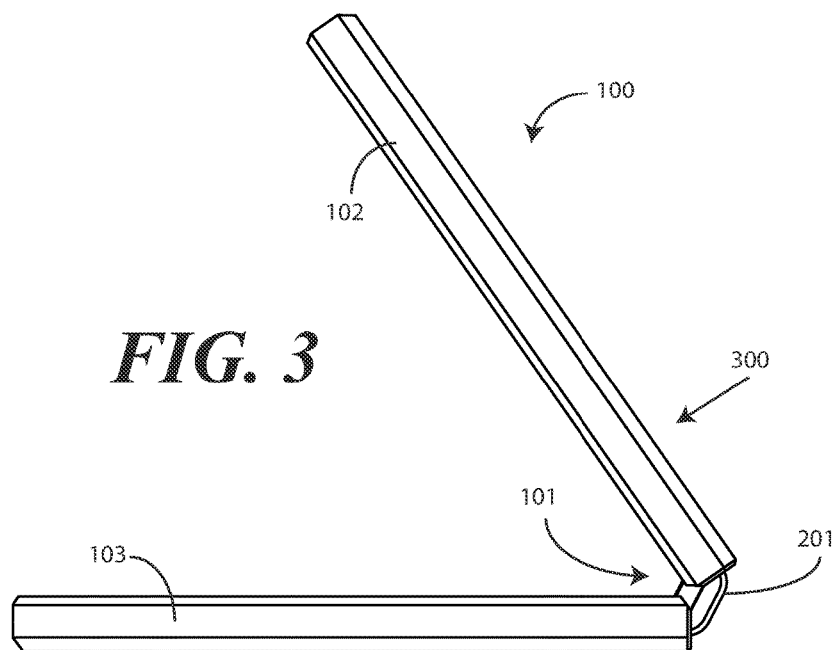
FIG. 3 illustrates a side elevation view of one explanatory electronic device in accordance with one or more embodiments of the disclosure in a partially open position.

In one embodiment, the electronic device 100 optionally includes one or more flex sensors 104, operable with the one or more processors 112, to detect a bending operation that causes the first device housing 102 to pivot about the hinge 101 relative to the second device housing 103, thereby transforming the electronic device 100 into a deformed geometry, such as that shown in FIGS. 2-3. The inclusion of flex sensors 104 is optional, and in some embodiment flex sensors 104 will not be included.

In one embodiment, the one or more processors 112 may generate commands or execute control operations based on information received from the various sensors, including the one or more flex sensors 104, the user interface, or the other sensors 109. The one or more processors 112 may also generate commands or execute control operations based upon information received from a combination of the one or more flex sensors 104, the user interface, or the other sensors 109. Alternatively, the one or more processors 112 can generate commands or execute control operations based upon information received from the one or more flex sensors 104 or the user interface alone. Moreover, the one or more processors 112 may process the received information alone or in combination with other data, such as the information stored in the memory 113.

The one or more other sensors 109 may include a microphone, an earpiece speaker, a second loudspeaker (disposed beneath speaker port 107), and a user interface component such as a button or touch-sensitive surface. The one or more other sensors 109 may also include key selection sensors, proximity sensors, a touch pad sensor, a touch screen sensor, a capacitive touch sensor, and one or more switches. Touch sensors may be used to indicate whether any of the user actuation targets present on the display 105 are being actuated. Alternatively, touch sensors disposed in the electronic device 100 can be used to determine whether the electronic device 100 is being touched at side edges or major faces of the first device housing 102 or the second device housing 103. The touch sensors can include surface and/or housing capacitive sensors in one embodiment. The other sensors 109 can also include audio sensors and video sensors (such as a camera).

The other sensors 109 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. A gyroscope can be used in a similar fashion.

Other components 111 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

In one or more embodiments, the electronic device 100 comprises a first energy storage device 118 and a second energy storage device 119. The first energy storage device 118 and the second energy storage device 119 can take a variety of forms. In an illustrative embodiment shown below in FIG. 6, the first energy storage device 118 and the second energy storage device 119 each comprise electrochemical cells. For instance, the first energy storage device 118 and the second energy storage device 119 can each comprise a lithium-ion, lithium-polymer, or other type of rechargeable cell. Other examples of energy storage devices suitable for use with embodiments of the disclosure will be obvious to those of ordinary skill in the art having the benefit of this disclosure. For instance, in other embodiments the first energy storage device 118 and the second energy storage device 119 may be a supercapacitor, and so forth.

In one or more embodiments, the first energy storage device 118 is situated within the first device housing 102, while the second energy storage device 119 is situated within the second device housing 103. In one or more embodiments, an electrical conductor (one example of which is illustrated and described below with reference to FIG. 7) couples the first energy storage device 118 to the second energy storage device 119.

Charging circuitry 117 can be included to selectively charge the first energy storage device 118 and the second energy storage device 119 when depleted. In one or more embodiments, the charging circuitry 117 comprises a charging node 120 that is coupled to the first energy storage device 118. In one or more embodiments, the charging circuitry also includes another conductor coupling the charging node 120 to the second energy storage device 119.

In one or more embodiments, the charging circuitry 117 includes a switch that is electrically coupled between the conductor coupling the first energy storage device 118 to the second energy storage device 119 and the second energy storage device 119. Opening the switch disconnects the conductor from the second energy storage device 119, while closing the switch couples, in one or more embodiments, the cathode of the first energy storage device 118 to the cathode of the second energy storage device 119.

In one or more embodiments, a control circuit 124 is then operable to open the switch when a difference between a voltage of the first energy storage device 118 and a voltage of the second energy storage device 119 exceeds a predefined voltage difference threshold. In one or more embodiments, the control circuit 124 is operable to close the switch when the difference between the voltage of the first energy storage device 118 and the voltage of the second energy storage device 119 is within the predefined voltage difference threshold. The operation of the switch and the control circuit 124 will be described in more detail below with reference to FIG. 8.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Turning now to FIG. 2, illustrated therein is the electronic device 100 in a closed state. In this state, the first device housing 102 has been pivoted about the hinge 101 toward the second device housing 103 to a closed position 200. When in the closed position 200, a front surface 202 of the first device housing 102 abuts a front surface 203 of the second device housing 103.

In this illustrative embodiment, a hinge housing 201 comprising the hinge 101 is revealed when the electronic device 100 is in the closed position 200. In other embodiments, the hinge housing 201 will remain concealed when the first device housing 102 pivots about the hinge 101 relative to the second device housing 103 to the closed position 200. Effectively, in either embodiment, the first device housing 102 and the second device housing 103 are analogous to clam shells that have been shut by the claim, thereby giving rise to the "clamshell" style of device. When the clamshell opens, the display (105) is revealed.

In some embodiments, features can be included to further retain the electronic device 100 in the closed position 200. Illustrating by example, in one embodiment a mechanical latch can be included to retain the first device housing 102 and the second device housing 103 in the closed position 200. In other embodiments, magnets can be incorporated into the front surface 202 of the first device housing 102 and the front surface 203 of the second device housing 103 to retain the first device housing 102 and the second device housing 103 in the closed position 200.

In still other embodiments, frictional elements can be incorporated into the hinge 101 to retain the first device housing 102 and the second device housing 103 in a particular position. A stator motor could be integrated into the hinge 101 to perform this function as well. In other embodiments torsion springs used in combination with a cam having mechanical detents and a stator with mechanical protrusions are used to perform this function. Still other mechanical structures and devices suitable for retaining the electronic device 100 in the closed position 200 will be obvious to those of ordinary skill in the art having the benefit of this disclosure.

Turning now to FIG. 3, the electronic device 100 is shown being transitioned from the closed position (200) of FIG. 2 to a partially open position 300. Specifically, the first device housing 102 is pivoting about the hinge 101 away from the second device housing 103 toward an open position. The open position 300 shown in FIG. 3 is a "tent position." In the side elevation view of FIG. 3, the hinge housing 201 is exposed between the first device housing 102 and the second device housing 103.

Figure 4:
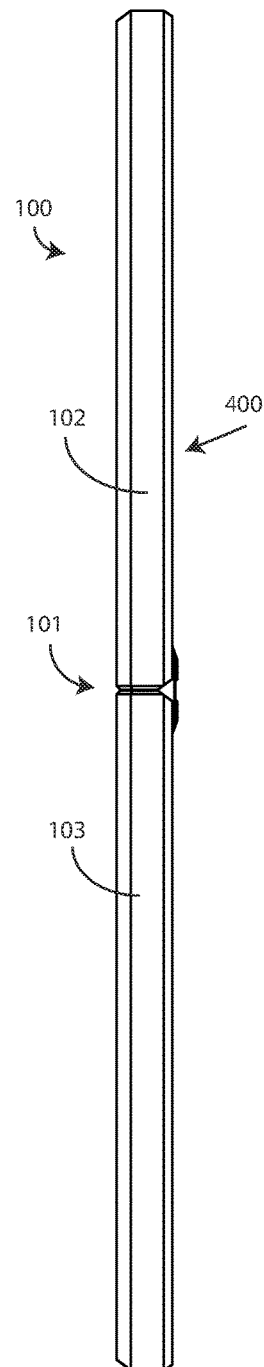
FIG. 4 illustrates a side elevation view of one explanatory electronic device in accordance with one or more embodiments of the disclosure in an axially displaced open position.

Turning now to FIG. 4, illustrated therein is the electronic device 100 in an axially displaced open position 400. In the axially displaced open position 400, the first device housing 102 is rotated about the hinge 101 so as to be axially displaced 180-degrees out of phase with the second device housing 103, thereby revealing the display (105). In this illustrative embodiment, this causes the hinge housing (201) to be concealed within the first device housing 102 and second device housing 103.

In such a configuration, the first device housing 102 and the second device housing 103 effectively define a plane. Since this illustrative embodiment includes a flexible display, the flexible display has been elongated into a flat position.

Figure 5:
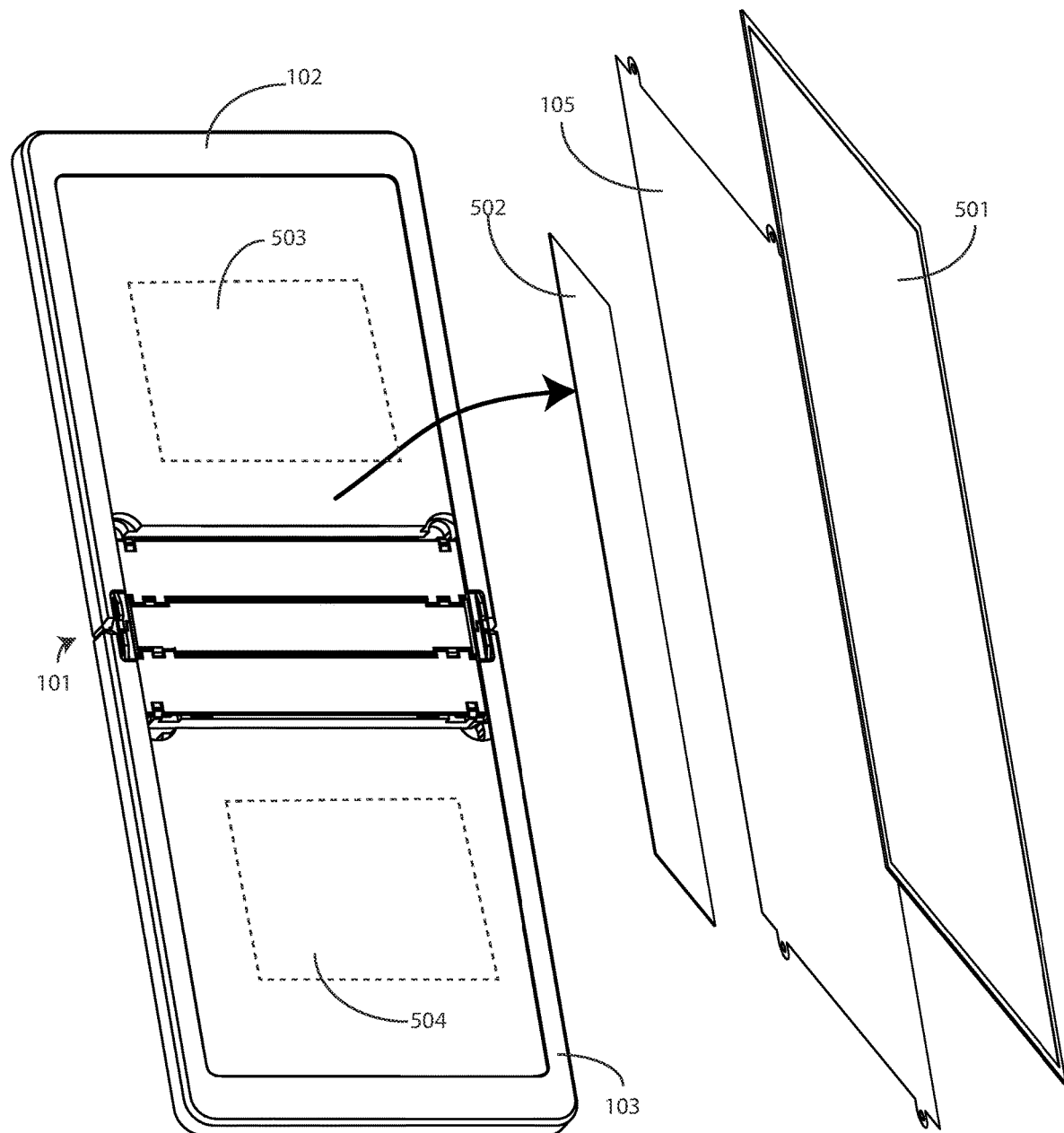
FIG. 5 illustrates an exploded view of one explanatory electronic device in accordance with one or more embodiments of the disclosure in the axially displaced open position.

Turning now to FIG. 5, illustrated therein is an exploded view of the electronic device 100. This view of the electronic device 100 allows various components of the first device housing 102, the second device housing 103, and the hinge 101 to be more clearly seen due to the fact that the display 105 and other components have been detached from the first device housing 102 and the second device housing 103 and shown in an exploded format.

As shown in FIG. 5, the display 105 is situated beneath a flexible fascia 501, which serves as a protective layer for the display 105. The display 105 and the flexible fascia 501 can be coupled to the first device housing 102 and the second device housing 103 so as to span the hinge 101. This allows the display 105 and flexible fascia 501 to deform when the first device housing 102 pivots about the hinge 101 relative to the second device housing 103.

Also shown in FIG. 5 is the flexible substrate 502. In one or more embodiments, the flexible substrate 502 provides a reliable electrical link through the hinge 101 between a first electronic circuit 503 disposed in the first device housing 102 and a second electronic circuit 504 disposed in the second device housing 103. In one or more embodiments, the flexible substrate 502 spans the hinge to couple the first electronic circuit 503 to the second electronic circuit 504.

Figure 6:
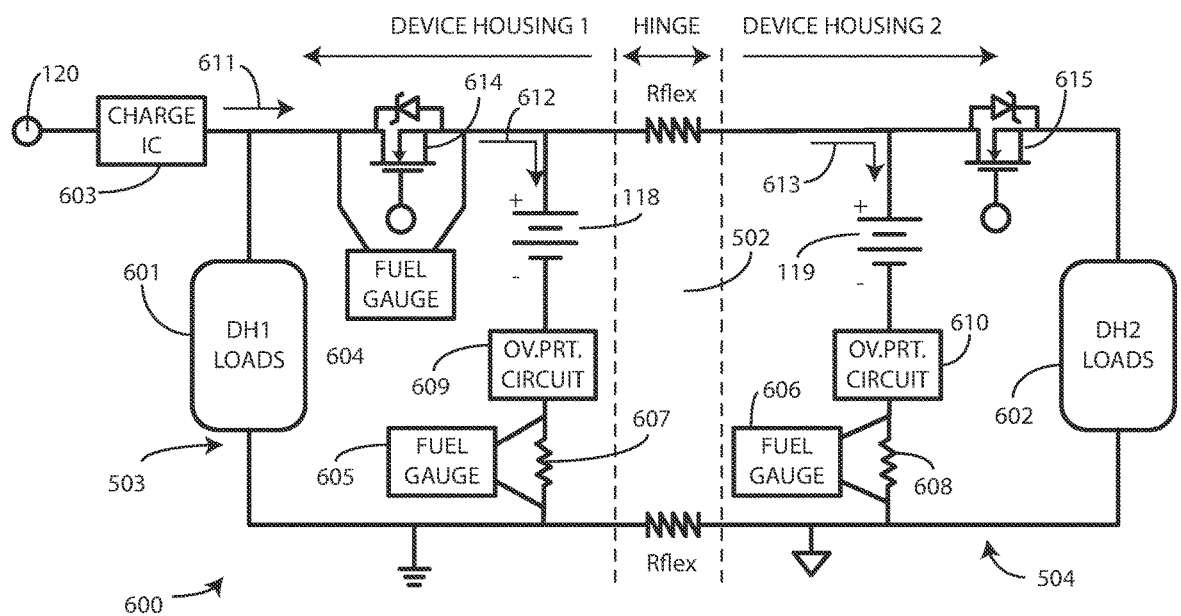
FIG. 6 illustrates one explanatory circuit in accordance with one or more embodiments of the disclosure.

Turning now to FIG. 6, illustrated therein is a schematic diagram 600 illustrating further details of one example the first electronic circuit 503 and the second electronic circuit 504. As shown, the flexible substrate 502 electrically couples the first electronic circuit 503 to the second electronic circuit 504. Power (voltage and current), digital signals, analog signals, common nodes (e.g., ground or Vcc), and other electrical connections can be coupled between the first electronic circuit 503 and the second electronic circuit 504 via the flexible substrate 502.

In one or more embodiments, each of the first electronic circuit 503 and the second electronic circuit 504 includes load elements 601,602 that can be configured as one or more electrical components, e.g., resistors, capacitors, inductors, integrated circuit chips, and so forth. In one or more embodiments, these load elements 601,602 can be coupled to one or more printed circuit boards or other substrates so as to form a printed circuit board assembly. The load elements 601,602 can include the some of the elements described above with reference to FIG. 1, such as the one or more processors (112), the memory (113), the communication circuit (114), the other components 111, and so forth.

The first electronic circuit 503 can include a first circuit board, while the second electronic circuit 504 can include a second circuit board, and so forth. In one embodiment, each of the first circuit board and the second circuit board can be manufactured from multiple layers. Some layers can comprise selectively placed conductive metal, such as copper or aluminum, while other layers can be insulative. Insulative layers can be manufactured from fiberglass, FR4, or other materials. In one or more embodiments, each of the first circuit board and the second circuit board comprises a fiberglass printed circuit board. In another embodiment, each of the first circuit board and the second circuit board is a FR4 printed circuit board.

In one or more embodiments, the first electronic circuit 503 comprises a first energy storage device 118, while the second electronic circuit 504 comprises a second energy storage device 119. In this illustrative embodiment, the first energy storage device 118 and the second energy storage device 119 each comprise rechargeable electrochemical cells. In one or more embodiments, the rechargeable electrochemical cells are lithium-based cells, such as lithium-ion or lithium-polymer cells. Other examples of both energy storage devices and rechargeable electrochemical cells will be obvious to those of ordinary skill in the art having the benefit of this disclosure.

Other components can be included to manage the charging and discharging of the first energy storage device 118 and the second energy storage device 119 in one or more embodiments. Illustrating by example, in one or more embodiments a charging circuit 603 is coupled between the charging node 120 and the first energy storage device 118 and the second energy storage device 119. A power supply (not shown) can be coupled to the charging node 120 to provide charging current 611 to the charging circuit 603, which can feed the charging current 612 to the first energy storage device 118 and charging current 613 to the second energy storage device 119, respectively. The charging circuit 603 can include a control circuit configured to control the amount of charging current 612,613 that flows to the first energy storage device 118 and the second energy storage device 119.

The charging circuit 603 limit current flowing to the first energy storage device 118 and the second energy storage device 119 by controlling a current control circuit. The current control circuit of the charging circuit 603 can include, for example, a sense resistor 607,608, a field effect transistor 614,615, and optionally a diode. These components can be coupled in series in one or more embodiments. The field effect transistors 614,615 can be used to limit, or stop, charging current 612,613 flowing from the charging node 120 to the first energy storage device 118 and the second energy storage device 119, respectively, while still allowing load currents to flow from the first energy storage device 118 and the second energy storage device 119 to the load elements 601,602 through the respective parasitic diode. The control circuit of the charging circuit 603 can use, as inputs, connections disposed on either side of the sense resistor 607,608, as well as inputs from the various fuel gauge circuits 604,605,66.

Data can be transferred between the control circuit of the charging circuit 603 and the memory (113) of the electronic device (100) for use in controlling the current control circuit. Examples of such data include rated charging limit of the first energy storage device 118 and the second energy storage device 119, rated discharging limit of the first energy storage device 118 and the second energy storage device 119, type of cell of each of the first energy storage device 118 and the second energy storage device 119, characteristic cell voltages corresponding to capacity thresholds of the first energy storage device 118 and the second energy storage device 119, and so forth. Other information useful for controlling the charge and discharge of the first energy storage device 118 and the second energy storage device 119 will be obvious to those of ordinary skill in the art having the benefit of this disclosure.

In operation, when a power supply is coupled to the charging node 120, charging current 611 can flow from the power supply to the first energy storage device 118 and the second energy storage device 119 to charge the first energy storage device 118 and the second energy storage device 119 from their discharge voltage limit to the rated charging limit. The charging circuit 603 can monitor the charging current 612,613 that is being transferred to the first energy storage device 118 and/or the second energy storage device 119 using one or more fuel gauge circuits 604,605,606 and/or current sense resistors 607,608. During the charging process, the charging circuit 603 can also monitor the temperature of the first energy storage device 118 and the second energy storage device 119 using a thermistor or other temperature measurement device. If the temperature rises above a predetermined threshold, the charging circuit 603 can adjust the flow of charging current 612,613 accordingly.

Each of the first energy storage device 118 and the second energy storage device 119 can have associated therewith an overprotection circuit 609,610. Each overprotection circuit 609,610 can monitor the charging current 612,613 to, and voltage of, the first energy storage device 118 and the second energy storage device 119, The overprotection circuit 609, 610 can additionally (and optionally) control the charging and discharging of the first energy storage device 118 and the second energy storage device 119 in one or more embodiments.

Illustrating by example, the overprotection circuits 609, 610 can include an overcharge detector that monitors the voltages across the corresponding energy storage device. The overcharge detector can then comparee these voltages to a predetermined maximum energy storage device voltage. When the energy storage device voltage exceeds this threshold, the overcharge detector, via some internal logic circuitry, can actuate a charge interrupt device, such as a transistor, to prevent any further charging of the first energy storage device 118 or the second energy storage device 119.

Similarly, overprotection circuits 609,610 can include an over discharge detector that ensures that the voltage across the first energy storage device 118 and second energy storage device 119 does not fall below a predetermined threshold. If it does, the over discharge detector can open to a disconnect device such as a serial transistor to prevent any further discharge of the cells.

In the illustrative embodiment of FIG. 6, the first energy storage device 118 and the second energy storage device 119 are coupled in parallel by the flexible substrate 502. This allows allowing the first energy storage device 118 and the second energy storage device 119 to function within the electronic device (100) effectively as a single energy storage device with a doubled current capacity.

As noted above with reference to FIG. 5, in one or more embodiments the flexible substrate 502 spans the hinge (101) of the electronic device (100). The flexible substrate 502 then bends and deforms as the first device housing (102) pivots about the hinge (101) relative to the second device housing (103) between the axially displaced open position (400) and the closed position (200). Due to the mechanical limitations of these dynamic requirements of the flexible substrate 502, which include limitations upon conductor thickness, number of layers of substrate, and so forth, the inherent resistance of the electrical conductors of the flexible substrate 502 becomes non-trivial. Moreover, due to the mechanical limitations imposed by some applications, it is frequently the case that this impedance cannot easily be lowered. In some instances, the impedance introduced between the first energy storage device 118 and the second energy storage device 119 can be on the order of one hundred milli-Ohms or more.

Embodiments of the disclosure contemplate that this impedance can have a significant and deleterious effect on the amount of time it takes to charge each of the first energy storage device 118 and the second energy storage device 119. Consider the situation where the charging current 611 passing through the charging circuit 603 is split into a first energy storage device charge current 612 and a second energy storage device charge current 613. Applying Kirchhoff's Circuit Laws and Ohm's Law results in the following equations (ESD1 is shorthand for first energy storage device, while ESD2 is shorthand for second energy storage device):

$$I_{CHARGE\_TOTAL} = I_{CHARGE\_ESD1} + I_{CHARGE\_ESD2} \quad \text{(EQ. 1)}$$

$$V_{FLEX} = I_{CHARGE\_ESD2} \times R_{FLEXIBLE\_SUBSTRATE} \quad \text{(EQ. 2)}$$

$$V_{FLEXIBLE\_SUBSTRATE} = V_{ESD1} - V_{ESD2} \quad \text{(EQ. 3)}$$

$$I_{CHARGE\_ESD2} = [V_{ESD1} - V_{ESD2}]/R_{FLEXIBLE\_SUBSTRATE} \quad \text{(EQ. 4)}$$

Now consider the situation where first energy storage device 118 and second energy storage device 119 are in a quiescent state and are at the same voltage, e.g., 4.0 volts, when a power supply is coupled to the charging node 120. Also assume that the impedance of the flexible substrate 502 is one hundred milli-Ohms. If the total charging current 611 is two amperes, substituting these values into EQ. 1 and EQ. 4 above results in the following equations:

$$I_{CHARGE\_ESD2} = [V_{ESD1} - V_{ESD2}]/R_{FLEXIBLE\_SUBSTRATE} = [4V-4]/0.1\Omega = 0.0\ A \quad \text{(EQ. 5)}$$

And $$I_{CHARGE\_ESD1} = I_{CHARGE\_TOTAL} - I_{CHARGE\_ESD2} = 2.0 - 0.0 = 2.0\ A \quad \text{(EQ. 6)}$$

As shown in EQS. 5 and 6, all of the charge current initially goes into the first energy storage device 118 and none gets to the second energy storage device 119 (at least momentarily). Of course, the voltages of the first energy storage device 118 and the second energy storage device 119 do not remain at exactly 4.0 volts for long once charging commences. Once the first energy storage device 118 starts to charge, its voltage will rise. Assume for the moment that the voltage of the first energy storage device 118 increases 50 milli-volts while the second energy storage device 119 remains at its original voltage of 4.0 volts. (Note that this does not really happen, as a very small portion of the charge current would begin to flow into the second energy storage device 119, allowing it to charge very slightly. However, for the purpose of illustration, this fact can be ignored for the moment). The following equations would result:

$$I_{CHARGE\_ESD2} = [V_{ESD1} - V_{ESD2}]/R_{FLEXIBLE\_SUBSTRATE} = [4.05V-4V]/0.1\Omega = 0.5\ A \quad \text{(EQ. 7)}$$

And $$I_{CHARGE\_ESD1} = I_{CHARGE\_TOTAL} - I_{CHARGE\_ESD1} = 2.0 - 0.5 = 1.5\ A \quad \text{(EQ. 8)}$$

By comparing EQ. 7 with EQ. 5, it can be seen that the current entering the second energy storage device 119 is becoming significant. This current will continue to increase as the difference between the voltages of the first energy storage device 118 and the second energy storage device 119 increases. Moreover, this trend will continue as the voltage of the first energy storage device 118 rises and levels off at its terminal voltage, which may be 4.45 volts or similar. This has the effect of decreasing the current that the first energy storage device 118 can accept. At some point in this process, the current into the second energy storage device 119 will increase above that entering the first energy storage device 118. By the end of the constant current portion of the charge curve, both the first energy storage device 118 and the second energy storage device 119 will be at or close to their terminal voltage and will then go into the constant voltage phase.

This operation expressed by EQS. 1-8 deleteriously affects overall charging time. To understand this, consider the charging constraints from the perspective of the first energy storage device 118 and the second energy storage device 119. Each energy storage device has a maximum charge current rating, which is specified by the manufacturer and is determined by the chemistry and internal structure of the energy storage device. In one or more embodiments, each of the first energy storage device 118 and the second energy storage device 119 are rated for a "1C" charge rate, where a "C" rate is the current (in or out) as a ratio of the charge or discharge current to the full capacity of the first energy storage device 118 or second energy storage device 119 in milli-amp-hours.

Thus, a "1C" rate of a 2000 milli-amp-hours energy storage device is 2000 milli-amps. If the charge current limit of the second energy storage device 119 is 1.50 amps, while the charge current limit for the first energy storage device 118 is 1.217 amps, these numbers represent the maximum current each energy storage device can safely accept and must be followed. However, in FIG. 6 there is only one charging circuit 603 limiting the total charging current 611 into the system. This charging circuit 603 must therefore limit the total charging current 611 such that neither limit is exceeded. The net effect is that a lower total charge current is necessary, resulting in longer charge time.

Figure 8:
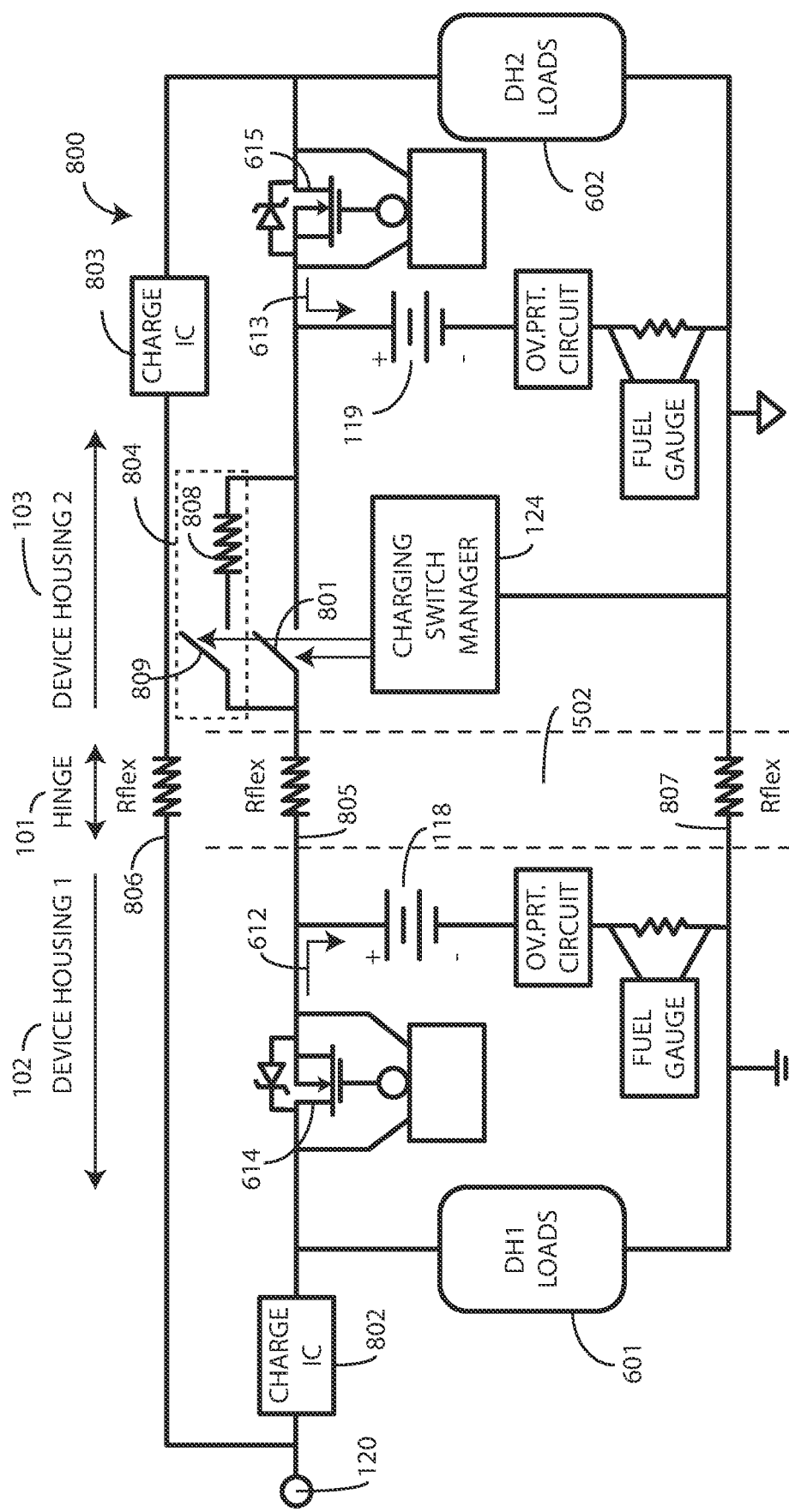
FIG. 8 illustrates another explanatory circuit in accordance with one or more embodiments of the disclosure.

Turning now to FIG. 8, illustrated therein is an alternate schematic diagram 800 that eliminates the deleterious charging effects caused by the inherent impedance of the flexible substrate (502) and circuit configuration of FIG. 6. The schematic diagram 800 of FIG. 8 includes at least one additional switch 801 that a control circuit 124 can control to electrically separate the first energy storage device 118 and the second energy storage device 119 while each is charging. The schematic diagram 800 also employs two charging circuits 802,803 to control the charging current 612,613 flowing into each of the first energy storage device 118 and the second energy storage device 119. This is in contrast to the single charging circuit (603) used in FIG. 6. In this way, charging current 612,613 flowing into each of the first energy storage device 118 and the second energy storage device 119 can be uniquely tailored to its manufacturer-specified limit.

Once charging is complete, e.g., when a power supply is disconnected from the charging node 120 or energy storage in the first energy storage device 118 and the second energy storage device 119 is maximized, the control circuit 124 (or alternatively the charging circuits 802,803 or another control circuit or processor set) can measure the voltage of each of the first energy storage device 118 and the second energy storage device 119 to ensure each is at a similar voltage level. If not, in one or more embodiments a current limiting conductor 804 coupled in parallel with the switch 801 allows the voltages of the first energy storage device 118 and the second energy storage device 119 to equalize. Once these voltages are within a predefined voltage difference threshold, the control circuit 124 can close the switch 801 to reestablish the electrical path coupling the first energy storage device 118 and the second energy storage device 119 in parallel to allow normal discharge into the load elements to resume.

In the schematic diagram 800 of FIG. 8, the first energy storage device 118 is coupled to the second energy storage device by a conductor 805 of the flexible substrate 502. A charging node 120 is operatively coupled to the first energy storage device 118. In contrast to the schematic diagram (600) of FIG. 6, in FIG. 8 another conductor 806 of the flexible substrate then operatively couples the charging node 120 to the second energy storage device 119.

As shown in FIG. 8, a first charging circuit 802 is coupled between the charging node 120 and the first energy storage device 118. Similarly, a second charging control circuit 803 is coupled between the other conductor 806 and the second energy storage device 119. These charging control circuits 802,803 can independently control the charge current 612, 613 flowing into the first energy storage device 118 and the second energy storage device 119 using field effect transistors 614,615 as previously described.

A switch 801 is then electrically coupled between the conductor 805 and the second energy storage device 119. A control circuit 124 opens the switch 801 when a difference between a voltage of the first energy storage device 118 and a voltage of the second energy storage device 119 exceeds a predefined voltage difference threshold. The control circuit 124 closes the switch 801 when the voltage of the first energy storage device 118 and the voltage of the second energy storage device 119 are within the predefined voltage difference threshold.

The predefined voltage difference threshold will be different for different energy storage devices, and will depend upon a variety of factors, including the internal impedances of the first energy storage device 118 and the second energy storage device 119, the impedance of the conductor 805 of the flexible substrate 502, and the impedance of the corresponding return conductor 807, in addition to other factors. In one or more embodiments, the predefined voltage difference threshold is 10 milli-volts. In another embodiment, the predefined voltage difference threshold is 25 milli-volts. In still another embodiment, the predefined voltage difference threshold is 50 milli-volts. In yet another embodiment, the predefined voltage difference threshold is 0.1 volts. Other examples of predefined voltage difference thresholds will be obvious to those of ordinary skill in the art having the benefit of this disclosure.

In the illustrative embodiment of FIG. 8, a current limiting conductor 804 is coupled in parallel with the switch 801. The current limiting conductor 804 allows balancing of the voltages of the first energy storage device 118 and the second energy storage device 119 by allowing a trickle current to flow around the switch 801.

The current limiting conductor 804 can take different forms. In one or more embodiments, the current limiting conductor 804 simply comprises a resistor 808 coupled in parallel with the switch 801. In the illustrative embodiment of FIG. 8, to allow for selective control of the balancing of the voltages of the first energy storage device 118 and the second energy storage device 119, the current limiting conductor 804 comprises a resistor 808 coupled in series with another switch 809, with that serial resistor—other switch combination being coupled in parallel with the switch 801. Accordingly, in some embodiments the other switch 809 will be included to allow for the control of current flowing through the current limiting conductor 804, while in other embodiments the other switch 809 will be omitted.

Where the other switch 809 is included, the control circuit 124 closes the other switch when the difference between the voltage of the first energy storage device 118 and the voltage of the second energy storage device 119 exceeds the predefined voltage difference threshold in one or more embodiments. In one or more embodiments, the control circuit 124 only closes the other switch when the difference between the voltage of the first energy storage device 118 and the voltage of the second energy storage device 119 exceeds the predefined voltage difference threshold and the switch 801 is open.

The control circuit 124 can then optionally open the other switch 809 when the difference between the voltage of the first energy storage device 118 and the voltage of the second energy storage device 119 falls within the predefined voltage difference threshold. However, where the control circuit 124 closes the switch 801 in response to the voltage of the first energy storage device 118 and the voltage of the second energy storage device 119 falling within the predefined voltage difference threshold, this provides a low impedance path in parallel to the current limiting conductor 804, thereby effectively taking it out of the circuit. Accordingly, in some embodiments after opening the other switch 809 when the difference between the voltage of the first energy storage device 118 and the voltage of the second energy storage device 119 exceeds the predefined voltage difference threshold, the control circuit 124 may simply allow the other switch 809 to remain closed when the voltage of the first energy storage device 118 and the voltage of the second energy storage device 119 falls back within the predefined voltage difference threshold.

In one or more embodiments, where the schematic diagram 800 is used in an electronic device configured as was the electronic device (100) of FIG. 1, i.e., with a first device housing 102 coupled to a second device housing 103 by a hinge 101, the first energy storage device 118 can be situated within the first device housing 102, while the second energy storage device 119 is situated in the second device housing 103. This configuration is shown in FIG. 8. Since the flexible substrate 502 spans the hinge 101, this results in the conductor 805 and the other conductor 806, as well as the return conductor 807, spanning the hinge 101 as well.

Embodiments of the disclosure contemplate that the conductor 805, the other conductor 806, and the return conductor 807 frequently will have to share real estate with other conductors along the flexible substrate 502. Illustrating by example, data conductors, signal conductors, and other conductors will generally also be included along the flexible substrate 502 to connect the circuit components of load element 601 to load element 602. Accordingly, design limitations may indeed be placed upon the amount of area of the flexible substrate 502 that the conductor 805, the other conductor 806, and the return conductor 807 can occupy.

With this in mind, embodiments of the disclosure contemplate that the impedances of each of the conductor 805, the other conductor 806, and the return conductor 807 can be different without sacrificing performance. For instance, in one or more embodiments the return conductor 807 has the lowest impedance of the three, as it defines a ground node for the schematic diagram 800. In one or more embodiments, the conductor 805 then has the next lowest impedance, since it defines a Vcc node for load element 601 and load element 602 in the schematic diagram 800. Where limitations have to be imposed, conductor 806 can then have the highest impedance of the three, as it is used only when charging the second energy storage device 119. Accordingly, in one or more embodiments the conductor 805 has a predefined impedance, while the other conductor 806 has an impedance that is greater than the predefined impedance.

Figure 7:
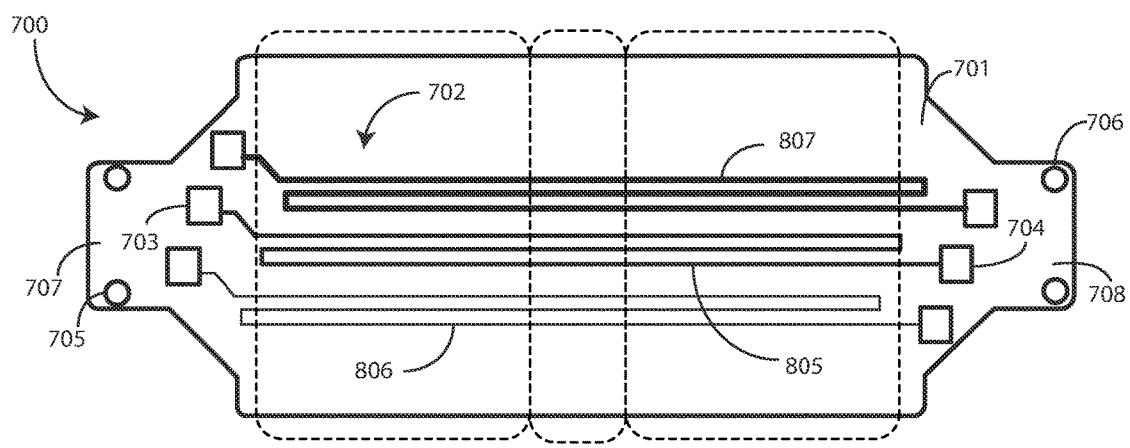
FIG. 7 illustrates one explanatory substrate supporting one or more electrical conductors in accordance with one or more embodiments of the disclosure.

Turning now to FIG. 7, illustrated therein is one explanatory flexible substrate 700 configured in this manner. One or more layers of insulative material 701 encapsulate one or more conductive electrical traces 702 in a sandwiched format. In one embodiment, the one or more layers of insulative material 701 encapsulate a single layer of one or more conductive electrical traces 702 in a sandwiched format. However, in other embodiments, the one or more layers of insulative material 701 will include a plurality of layers of insulative material so as to encapsulate multiple layers of conductive electrical traces. Other configurations for the flexible substrate 700 will be obvious to those of ordinary skill in the art having the benefit of this disclosure.

In one or more embodiments, one or more conductive electrical pads 703,704 can be exposed in the insulative material 701 and can be coupled electrically by the one or more conductive electrical traces 702. The flexible substrate 700 can include one or more apertures 705,706 or other mechanical features that allow the first end 707 and second end 708 of the flexible substrate 700 to be anchored within a device housing.

In this illustrative embodiment, the flexible substrate 700 is configured as a double-tapering polygon having a length of between seventy-three millimeters and seventy-four millimeters, and a width of about twenty-seven millimeters. The first end 707 and the second end 708 are narrower than is the movable region that spans the hinge (101) of an electronic device (100). In this embodiment, the movable region has a length of between fifty-one and fifty-two millimeters. The double-tapering polygon includes a generally rectangular shape for the movable region, bounded at each end by a frustoconical tapering portion. The frustoconical tapering portions are then bounded by the generally rectangular first end 707 and second end 708. This double-tapering polygon illustrates the fact that flexible substrates configured in accordance with embodiments of the disclosure can be configured in a variety of different shapes.

As shown in FIG. 7, the one or more electrical traces 702 include the return conductor 807, the conductor 805, and the other conductor 806. In this illustrative embodiment, the return conductor 807 includes the largest amount of conductive material, and thus has the lowest impedance of the three. The conductor 805 has more conductive material than does the other conductor 806, giving it a predefined impedance that is less than that of the other conductor 806. The printed trace configurations shown in FIG. 7 are illustrative only, as others will be obvious to those of ordinary skill in the art having the benefit of this disclosure. However, they demonstrate how in one or more embodiments where the conductor 805 has a predefined impedance, the other conductor 806 can have another predefined impedance that is greater than the predefined impedance of the conductor 805.

Figure 9:
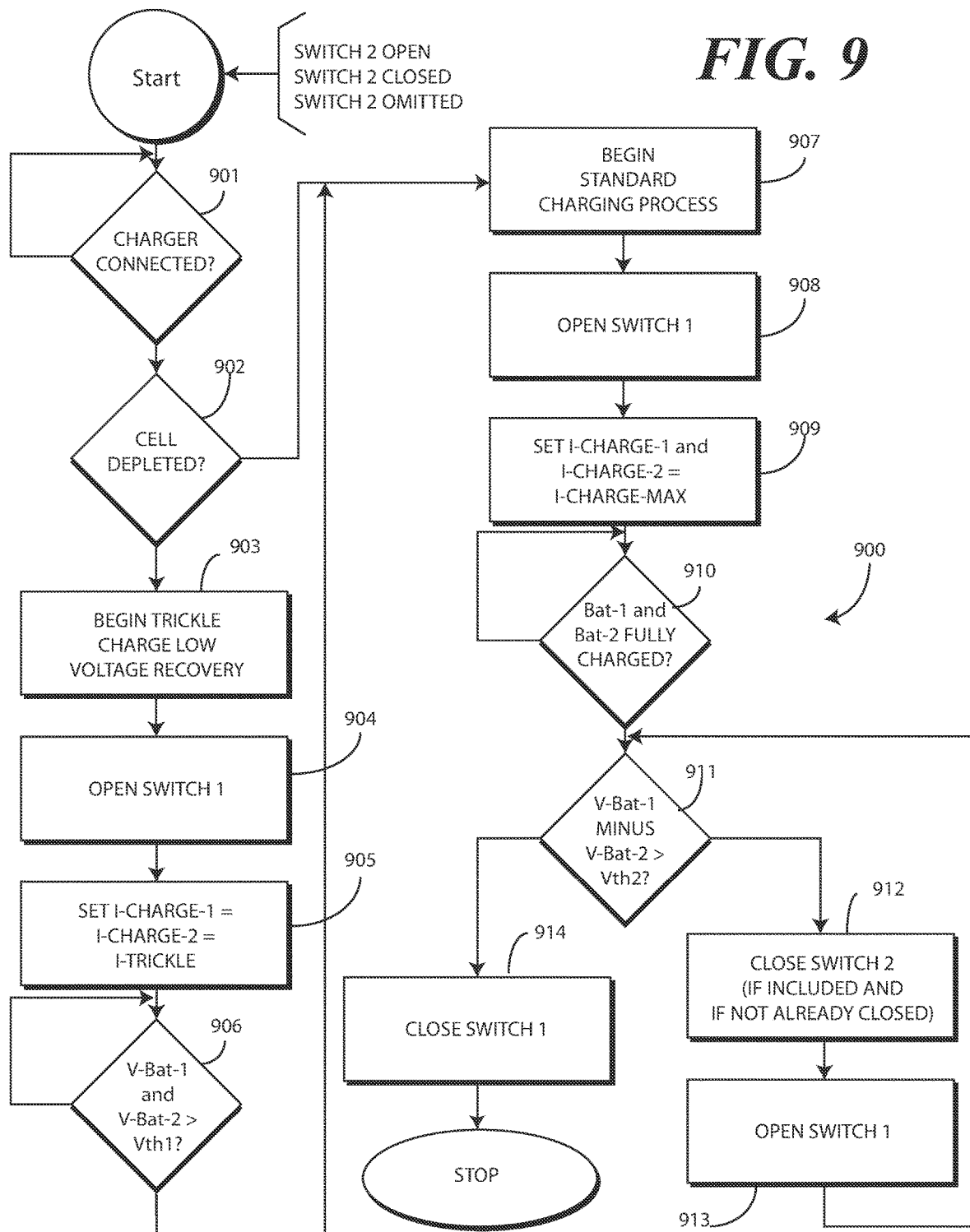
FIG. 9 illustrates one explanatory method in accordance with one or more embodiments of the disclosure.

Turning now to FIG. 9, illustrated therein is one explanatory method 900 of using the schematic diagram (800) of FIG. 8 in accordance with one or more embodiments of the disclosure. The method 900 includes opening a switch (801) coupled between a first energy storage device (118) and an electrical conductor (805) coupling the switch (801) to a second energy storage device (119) when a difference between a voltage of the first energy storage device (118) and a voltage of the second energy storage device (119) exceeds a predefined voltage difference threshold, thereby allowing a first charging current (612) to flow from a charging node (120) to the first energy storage device (118) through the electrical conductor (805) and a second charging current (613) to flow from the charging node (1200 to the second energy storage device (119) through the other conductor (806). The method 900 then closes the switch (801) when the difference between the voltage of the first energy storage device (118) and the voltage of the second energy storage device (119) is within the predefined voltage difference threshold to electrically couple the first energy storage device (118) to the second energy storage device (119) with the electrical conductor (805).

It should be noted that the method 900 can begin with the current limiting conductor (804) in differing configurations. Recall from above that in one embodiment, the current limiting conductor (804) comprises only a current limiting resistor (808), with the other switch (809) omitted from the schematic diagram (800). This is one possible configuration. In another configuration, the other switch (809) is included and is open when the method 900 begins. In still another configuration, the other switch (809) is included and is closed when the method 900 begins.

At decision 901, the method 900 determines whether a power supply is coupled to the charging node (120). Where it is, the method proceeds to decision 902. Where it is not, the method 900 waits for a power supply to be coupled to the charging node (120) in one or more embodiments.

At decision 902, the method 900 determines whether either of the first energy storage device (118) or the second energy storage device (119) has been depleted below a minimum energy storage threshold. Effectively, decision 902 determines whether either of the first energy storage device (118) or the second energy storage device (119) is "dead." Recall from above that in operation, when a power supply is coupled to the charging node (120) the charging circuits (802,803) can deliver charging current (612,613) from the power supply to the first energy storage device (118) and the second energy storage device (119) to charge the first energy storage device (118) and the second energy storage device (119) from their discharge voltage limit to the rated charging limit. Decision 902 determines whether the first energy storage device (118) and the second energy storage device (119) have somehow been depleted below their discharge voltage limit. Where they have, a recovery process begins at step 903. Otherwise, the method 900 proceeds to step 907 where a standard charging process begins.

At step 904, the switch (801) is opened. At step 905, the charging circuits (802,803) begin a trickle charging process to deliver a small current to one or both of the first energy storage device (118) and/or the second energy storage device (119) to slowly bring their voltages, and thus stored energy amount, back to the discharge voltage limit. Decision 906 determines whether this occurs, and the process can repeat until the first energy storage device (118) and the second energy storage device (119) are both above the discharge voltage limit.

The standard charging process then begins at step 907. In one or more embodiments, step 908 comprises opening the switch (801) coupled between the first energy storage device (118) and the electrical conductor (805) coupling the switch (801) to the second energy storage device (119), thereby allowing a first charging current (612) to flow from the charging node (120) to the first energy storage device (118) through the conductor (805) and a second charging current (613) to flow from the charging node (120) to the second energy storage device (119) through another conductor (806) at step 909. In one or more embodiments, step 903 occurs in response to a charger or power supply being coupled to the charging node (120).

Decision 910 determines whether the first energy storage device (118) and the second energy storage device (119) have reached their rated charging limit. Where it has not, charging continues with the charging currents (612,613) set for the maximum rated charging current for the first energy storage device (118) and second energy storage device (119), respectively, at step 909.

Decision 910 determines whether a difference between the voltage of the first energy storage device and the voltage of the second energy storage device exceeds a predefined voltage difference threshold. Where it does, and where the other switch (809) is included and is open when the method 900 starts, step 912 comprises closing this other switch (809) to allow balancing of the first energy storage device (118) and the second energy storage device (119). Said differently, in one or more embodiments step 912 comprises coupling a current limiting conductor (804) in parallel with the switch (801). Step 913, which can precede step 912, ensures that the switch (801) is open while this balancing occurs. Accordingly, in one or more embodiments step 912 occurs while the difference between the voltage of the first energy storage device (118) and the second energy storage device (119) exceeds the predefined voltage difference threshold and the switch (801) is open. In one or more embodiments, step 912 closes the other switch (809) with the other switch (809) coupled serially with a resistor (808), thereby defining the current limiting conductor (804).

When the difference between the voltage of the first energy storage device (118) and a voltage of the second energy storage device (119) falls within the predefined voltage difference threshold at decision 911, step 914 comprises closing the switch (801) so that the first energy storage device (118) and the second energy storage device (119), now balanced, can be coupled in parallel to deliver load currents to a first load element (601) and a second load element (602). Optionally, where the other switch (809) is included and is closed, step 914 can comprise opening the other switch (809) when the first energy storage device (118) and a voltage of the second energy storage device (119) falls within the predefined voltage difference threshold as well.

Figure 10:
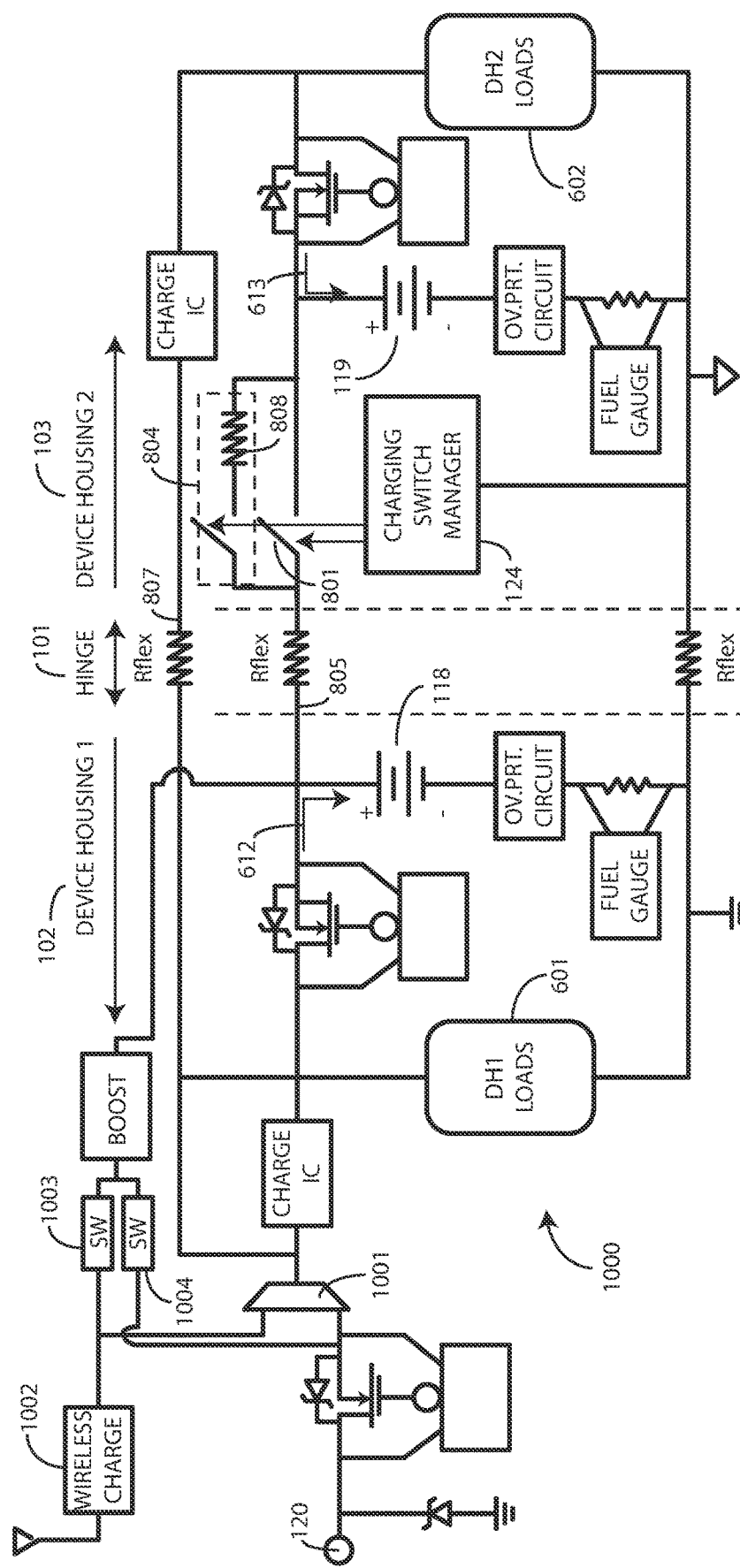
FIG. 10 illustrates still another explanatory circuit in accordance with one or more embodiments of the disclosure.

Turning now to FIG. 10, illustrated therein is another schematic diagram 1000 in accordance with one or more embodiments of the disclosure. The components of the schematic diagram (1000) of FIG. 10 are similar to those of the schematic diagram (800) of FIG. 8. For instance, an electronic device (100) includes a first device housing 102 coupled to a second device housing 103 by a hinge 101. A first energy storage device 118 is situated in the first device housing 102, while a second energy storage device 119 is situated in the second device housing 103 and electrically coupled to the first energy storage device 118 by a conductor 805 spanning the hinge 101.

A charging node 120 at the first device housing 102 is electrically coupled to the first energy storage device 118. The charging node 120 is electrically coupled to the second energy storage device 119 by the conductor 805 as well. Additionally, another conductor 807 spans the hinge 101 and also couples the charging node 120 to the second energy storage device 119 as previously described.

A switch 801 is electrically coupled between the conductor 805 spanning the hinge 101 and the second energy storage device 119. A control circuit 124 is then coupled to the switch 801. In one or more embodiments, the control circuit 124 opens the switch 801 during charging, thereby allowing a first charging current 612 to flow from the charging node 120 to the first energy storage device 118 through the conductor 805 and a second charging current 613 to flow from the charging node 120 to the second energy storage device 119 through the other conductor 807. Once the charging process is complete, the control circuit 124 closes the switch 801 when a difference between a voltage of the first energy storage device (118) and a voltage of the second energy storage device (119) is within a predefined voltage difference threshold.

As before, a current limiting conductor 804 is coupled in parallel with the switch 801. Here the current limiting conductor 804 comprises a resistor coupled serially with another switch 809. In one or more embodiments, the control circuit 124 closes the other switch 809 when the difference between the voltage of the first energy storage device 118 and the voltage of the second energy storage device 119 exceeds the predefined voltage different threshold. In one or more embodiments, the control circuit 124 closes the other switch 809 only when the switch 801 is open.

The schematic diagram 1000 of FIG. 10 differs from the schematic diagram (800) of FIG. 8 in that it includes a combiner 1001 that allows the charging current 612,613 to be delivered from either the charging node 120 or from a wireless charging node 1002. By controlling two switches 1003,1004, the schematic diagram 1000 can allow the first energy storage device 118 and the second energy storage device 119 to receive charging current 612,613 from, or deliver load current to, either or both of the charging node 120 and/or the wireless charging node 1002, with the latter powering accessory devices coupled to the respective node.

Figure 11:
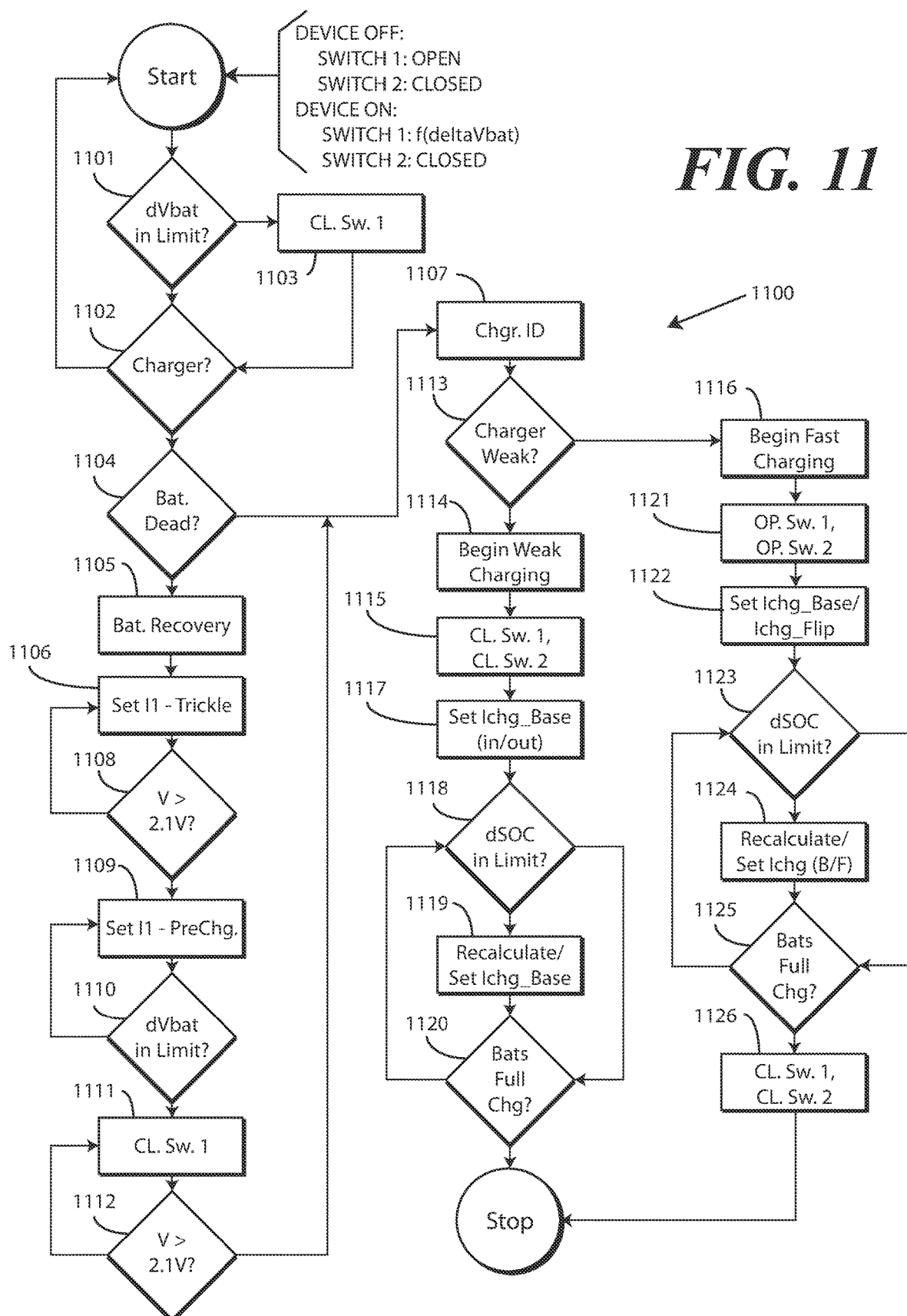
FIG. 11 illustrates another explanatory method in accordance with one or more embodiments of the disclosure.

Turning now to FIG. 11, illustrated therein is another explanatory method 1100 in accordance with one or more embodiments of the disclosure. The method 1100 of FIG. 11 could be used with either the schematic diagram (800) of FIG. 8 or the schematic diagram (1000) of FIG. 10. For simplicity, reference will be made to the schematic diagram (800) of FIG. 8 when describing the method 1100 of FIG. 11. Those of ordinary skill in the art having the benefit of this disclosure will readily understand from these teachings the application of the method 1100 of FIG. 11 to the schematic diagram (1000) of FIG. 10 from these teachings.

As with the method (900) of FIG. 9, the method 1100 of FIG. 11 includes opening a switch (801) coupled between a first energy storage device (118) and an electrical conductor (805) coupling the switch (801) to a second energy storage device (119) when a difference between a voltage of the first energy storage device (118) and a voltage of the second energy storage device (119) exceeds a predefined voltage difference threshold. This action allows a first charging current (612) to flow from a charging node (120) to the first energy storage device (118) through the electrical conductor (805) and a second charging current (613) to flow from the charging node (1200 to the second energy storage device (119) through the other conductor (806). The method 1100 then closes the switch (801) when the difference between the voltage of the first energy storage device (118) and the voltage of the second energy storage device (119) is within the predefined voltage difference threshold to electrically couple the first energy storage device (118) to the second energy storage device (119) with the electrical conductor (805).

It should be noted that the method 1100 can begin with the current limiting conductor (804) in differing configurations. In one or more embodiments, the state of each of the switch (801) and the other switch (809) is a function of whether the electronic device (100) in which the schematic diagram (800) is operating is ON, e.g., unlocked, active, and usable, or OFF, e.g., in a low-power, sleep, or inactive mode.

In one or more embodiments, when the electronic device (100) in which the schematic diagram (800) is operating is OFF, the switch (801) is open when the method 1100 begins. In one or more embodiments, the other switch (809) is closed when the method 1100 begins and the electronic device (100) in which the schematic diagram (800) is operating is OFF.

In one or more embodiments, when the electronic device (100) in which the schematic diagram (800) is operating is ON, the other switch (809) is closed when the method 1100 begins. In one or more embodiments, when the electronic device (100) in which the schematic diagram (800) is operating is ON, the state of the switch (801) can be either open or closed depending upon the state of charge of each of the first energy storage device (118) and the second energy storage device (119). Illustrating by example, in one embodiment where the difference in the voltage of the first energy storage device (118) or the second energy storage device (119) is within a predefined difference threshold and the electronic device (100) is ON, the switch 801 is closed when the method 1100 begins. However, where the difference in the voltage of the first energy storage device (118) or the second energy storage device (119) exceeds the predefined difference threshold and the electronic device (100) is ON, the switch 801 is open when the method 1100 begins.

In other embodiments, such as where the current limiting conductor (804) comprises only a current limiting resistor (808), with the other switch (809) omitted from the schematic diagram (800), the switch (801) will be open when the method 1100 begins and the electronic device (100) is OFF. Of course, both the switch (801) and the other switch (809) can be open when the method 1100 begins as well.

Decision 1101 determines whether a difference between the voltage of the first energy storage device (118) and the voltage of the second energy storage device (119) is within a predefined voltage difference threshold. In one or more embodiments, the predefined voltage difference threshold is 10 milli-volts. In another embodiment, the predefined voltage difference threshold is 25 milli-volts. In still another embodiment, the predefined voltage difference threshold is 50 milli-volts. In yet another embodiment, the predefined voltage difference threshold is 0.1 volts. Other examples of predefined voltage difference thresholds will be obvious to those of ordinary skill in the art having the benefit of this disclosure.

Where it is, step 1103 comprises closing the switch (801) to bypass the current limiting conductor (804) coupled in parallel with the switch (801) via the fact that the other switch (809) is closed. Said differently, when the difference between the voltage of the first energy storage device (118) and a voltage of the second energy storage device (119) falls within the predefined voltage difference threshold at decision 1101, step 1103 comprises closing the switch (801) so that the first energy storage device (118) and the second energy storage device (119), which are in balance, are be coupled in parallel so as to be able to deliver load currents to a first load element (601) and a second load element (602). The method 1100 then moves to decision 1102.

Where decision 1101 determines that difference between the voltage of the first energy storage device (118) and the voltage of the second energy storage device (119) exceeds the predefined voltage difference threshold, the method 1100 also moves to decision 1102. At decision 1102, the method 1100 determines whether a power supply is coupled to the charging node (120). Where it is, the method proceeds to decision 1104. Where it is not, the method 900 waits for a power supply to be coupled to the charging node (120) in one or more embodiments.

At decision 1104, the method 1100 determines whether either of the first energy storage device (118) or the second energy storage device (119) has been depleted below a minimum energy storage threshold. Said differently, decision 1104 determines whether either of the first energy storage device (118) or the second energy storage device (119) is "dead." When a power supply is coupled to the charging node (120) the charging circuits (802,803) can deliver charging current (612,613) from the power supply to the first energy storage device (118) and the second energy storage device (119) to charge the first energy storage device (118) and the second energy storage device (119) from their discharge voltage limit to the rated charging limit. Decision 1104 determines whether the first energy storage device (118) and the second energy storage device (119) have been depleted below their discharge voltage limit. Where they have, a recovery process begins at step 1105. Otherwise, the method 1100 proceeds to step 1107 where a standard charging process begins.

At step 1106, the charging circuits (802,803) begin a trickle charging process to deliver a small current to one or both of the first energy storage device (118) and/or the second energy storage device (119) to slowly bring their voltages, and thus stored energy amount, back to the discharge voltage limit. Decision 1108 determines whether this occurs, and the process can repeat until the first energy storage device (118) and the second energy storage device (119) are both above the discharge voltage limit, one example of which is 2.1 volts for a single-cell, lithium based battery.

Step 1109 begins a pre-charge process. At step 1109, charging circuit (802) sets a first charging current (612) to a predefined pre-charge current limit, such as 450 milli-Amps to slowly bring the voltage of the first energy storage device (118) to a predefined threshold at which it can be charged with a higher current, one example of which is 2.8 volts. Decision 1110 then determines whether a difference between the voltage of the first energy storage device (118) and the voltage of the second energy storage device (119) is within the predefined voltage difference threshold. Where it is, the method moves to step 1111, where the switch (801) is closed. Otherwise, the pre-charge current continues to be delivered to the first energy storage device (118).

Decision 1112 then determines whether the voltage of the first energy storage device (118) is above a predefined voltage limit, one example of which is 2.8 volts. Where it is not, the pre-charge current continues to be delivered to the first energy storage device (118). However, where it is, the method 1100 moves to step 1107.

Step 1107 identifies the type of power supply coupled to the charging node (120). Embodiments of the disclosure contemplate that some power supplies are configured to deliver larger amounts of current than others. Illustrating by example, some power supplies are considered "weak" chargers because they deliver a total current of one Amp or less. By contrast, other power supplies are considered "strong" power supplies because they are capable of delivering more than one Amp, and in some embodiments between one Amp and three Amps. Accordingly, in one or more embodiments step 1107 comprises identifying the type of power supply coupled to the charging node (120), with decision 1113 determining whether the power supply coupled to the charging node (120) is a strong power supply or a weak power supply.

Where the power supply coupled to the charging node (120) is a weak charger, a charging process using the less than one Amp of current being delivered to the charging node (120) commences at step 1114. Both the switch (801) and the other switch (809) are closed at step 1115. This allows charging circuit (802) to charge both the first energy storage device (118) and the second energy storage device (119).

Step 1117 includes adjusting the charging circuit (802) such that the sum of the first charging current (612) and the second charging current (613) to a limit set forth by the following equation:

$$I_{CHARGE\_ESD1\_ESD2} = CAP_{ESD1}/CAP_{ESD1\_ESD2} *\\ (I_{CHARGE\_MAX} - I_{CHARGE\_LOAD601 + LOAD602}) +\\ I_{CHARGE\_LOAD601} \quad \text{(EQ. 9)}$$

where "CAP" refers to the energy storage capacity of the indicated energy storage device. Decision 1118 then determines whether the state of charge, represented in milli-Amp-hours, of the first energy storage device (118) and the second energy storage device (119) exceeds a predefined state of charge limit, one example of which is fifteen milli-Amp-hours. Were it does, i.e., where there is a sufficient mismatch in the state of charge of the first energy storage device (118) and the second energy storage device (119), the process of adjusting the charging circuit (802) such that the sum of the first charging current (612) and the second charging current (613) to a limit set forth by EQ. 9 is repeated at step 1119 as the state of charge of the first energy storage device (118) and the second energy storage device (119) continues to increase.

Once the state of charge of the first energy storage device (118) and the second energy storage device (119) falls within the predefined state of charge limit, decision 1120 determines whether the first energy storage device (118) and the second energy storage device (119) have reached their rated charging limit. Where it has not, charging continues with the charging currents (612,613) set in accordance with EQ. 9 above at step 1119. Otherwise, the method 1100 ends.

Had the power supply coupled to the charging node (120) been determined to be a strong charger at decision 1113, the method would have proceeded to step 1116, where a fast charging process could commence. Step 1121 would then open the switch (801) and the other switch (902), thereby allowing a first charging current (612) to flow from the charging node (120) to the first energy storage device (118) through the conductor (805) and a second charging current (613) to flow from the charging node (120) to the second energy storage device (119) through another conductor (806).

Since two charging circuits (802,803) are charging the first energy storage device (118) and the second energy storage device (119) in this condition, step 1122 then sets the first charging current (612) and the second charging current (613). The first charging current (612) is set in accordance with EQ. 9 above. To wit, step 1122 adjusts the first charging circuit (802) such that the first charging current (612) is set to a limit set forth by EQ. 9. Similarly, step 1122 adjusts the second charging circuit (803) such that the second charging current is set to a limit set forth by the following equation:

$$I_{CHARGE\_ESD1\_ESD2} = CAP_{ESD2}/CAP_{ESD1\_ESD2} *\\ (I_{CHARGE\_MAX} - I_{CHARGE\_LOAD601 + LOAD602}) +\\ I_{CHARGE\_LOAD602} \quad \text{(EQ. 10)}$$

Decision 1123 then determines whether the state of charge, represented in milli-Amp-hours, of the first energy storage device (118) and the second energy storage device (119) exceeds a predefined state of charge limit, one example of which is fifteen milli-Amp-hours. Were it does, i.e., where there is a sufficient mismatch in the state of charge of the first energy storage device (118) and the second energy storage device (119), the process of adjusting the charging circuit (802) such that the first charging current (612) is limited by EQ. 9 and the second charging current (613) is limited by EQ. 10 is repeated at step 1124 as the state of charge of the first energy storage device (118) and the second energy storage device (119) continues to increase.

Once the state of charge of the first energy storage device (118) and the second energy storage device (119) falls within the predefined state of charge limit, decision 1125 determines whether the first energy storage device (118) and the second energy storage device (119) have reached their rated charging limit. Where it has not, charging continues with the charging currents (612,613) set in accordance with EQ. 9 above at step 1119. Otherwise, the switch (801) and the other switch (809) are closed at step 1126 and the method 1100 ends.

Figure 12:
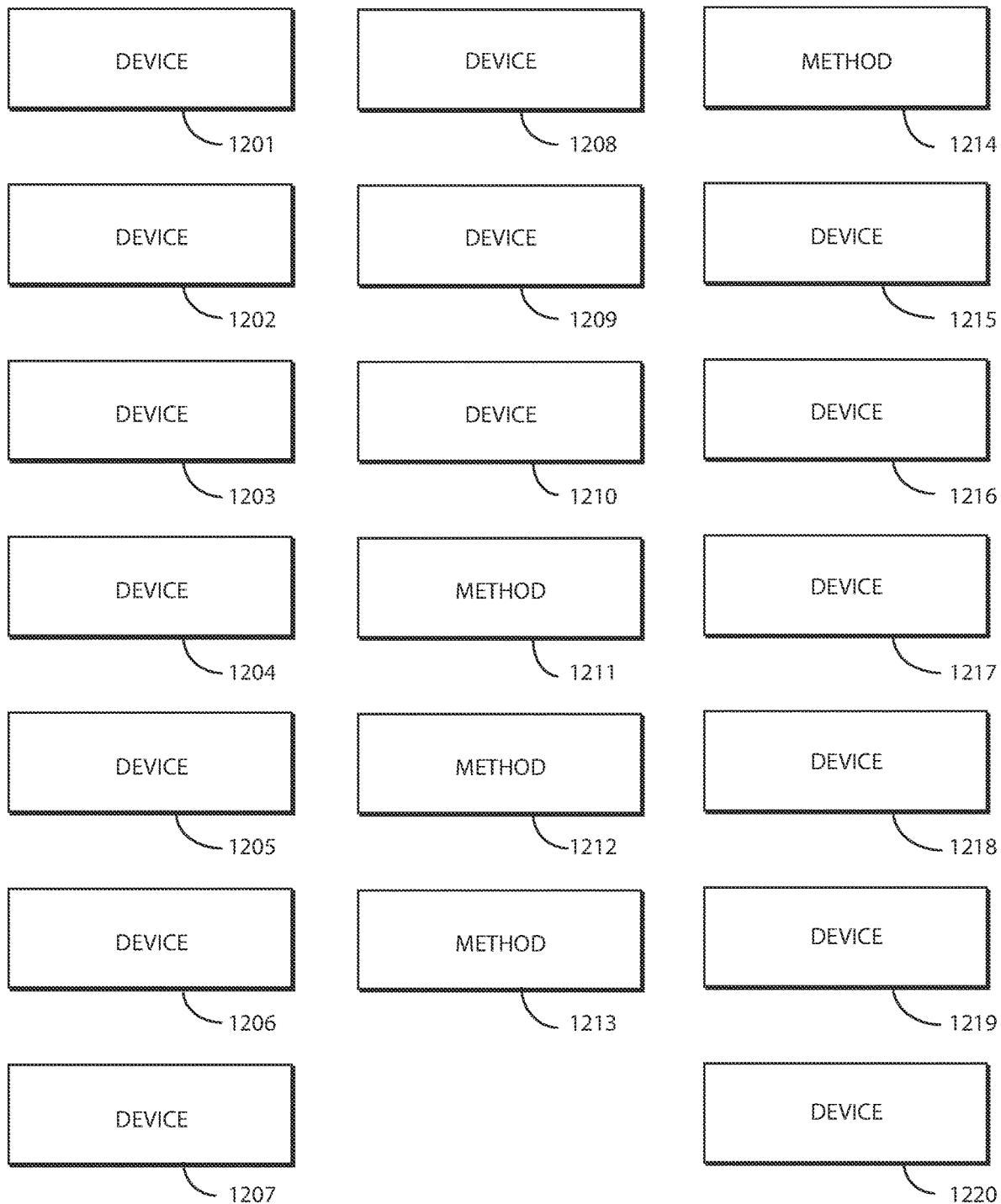
FIG. 12 illustrates various embodiments of the disclosure.

Turning now to FIG. 12, illustrated therein are various embodiments of the disclosure. The embodiments of FIG. 12 are shown as labeled boxes in FIG. 12 due to the fact that the individual components of these embodiments have been illustrated in detail in FIGS. 1-11, which precede FIG. 12. Accordingly, since these items have previously been illustrated and described, their repeated illustration is no longer essential for a proper understanding of these embodiments. Thus, the embodiments are shown as labeled boxes.

At 1201, an electronic device comprises a first energy storage device coupled to a second energy storage device by a conductor. At 1201, the electronic device comprises a charging node coupled to the first energy storage device.

At 1201, the electronic device comprises another conductor coupling the charging node to the second energy storage device. At 1201, the electronic device comprises a switch electrically coupled between the conductor and the second energy storage device.

At 1201, a control circuit opens the switch when a difference between a voltage of the first energy storage device and a voltage of the second energy storage device exceeds a predefined voltage difference threshold. At 1201, the control circuit closes the switch when the difference between the voltage of the first energy storage device and the voltage of the second energy storage device is within the predefined voltage difference threshold.

At 1202, the electronic device of 1201 further comprises a current limiting conductor coupled in parallel with the switch. At 1203, the current limiting conductor of 1202 comprises a resistor coupled in parallel with the switch. At 1204, the current limiting conductor of 1202 comprises a resistor coupled in series with another switch.

At 1205, the control circuit of 1204 closes the other switch when the difference between the voltage of the first energy storage device and the voltage of the second energy storage device exceeds the predefined voltage difference threshold. At 1206, the control circuit of 1205 closes the other switch only when both the difference between the voltage of the first energy storage device and the voltage of the second energy storage device exceeds the predefined voltage difference threshold and the switch is open.

At 1207, the electronic device of 1201 further comprises a first device housing coupled to a second device housing by a hinge, with the first energy storage device situated within the first device housing, the second energy storage device situated within the second device housing, and the conductor and the other conductor spanning the hinge. At 1208, the conductor of 1207 has a predefined impedance, and the other conductor has another predefined impedance that is greater than the predefined impedance.

At 1209, the electronic device of 1201 further comprises a first charging control circuit coupled between the charging node and the first energy storage device and a second charging control circuit coupled between the other conductor and the second energy storage device. At 1210, the electronic device of 1209 further comprises a wireless charging terminal coupled to both the first charging control circuit and the other conductor.

At 1211, a method in an electronic device comprises opening a switch coupled between a first energy storage device and an electrical conductor coupling the switch to a second energy storage device when a difference between a voltage of the first energy storage device and a voltage of the second energy storage device exceeds a predefined voltage difference threshold, thereby allowing a first charging current to flow from a charging node to the first energy storage device through the electrical conductor and a second charging current to flow from the charging node to the second energy storage device through another electrical conductor. At 1211, the method comprises closing the switch when the difference between the voltage of the first energy storage device and the voltage of the second energy storage device is within the predefined voltage difference threshold to electrically couple the first energy storage device to the second energy storage device with the electrical conductor.

At 1212, the method of 1211 further comprises coupling a current limiting conductor in parallel with the switch while the difference between the voltage of the first energy storage device and the voltage of the second energy storage device exceeds the predefined voltage difference threshold and the switch is open. At 1213, the coupling of 1212 comprises closing another switch serially coupled with a resistor, with the other switch and the resistor defining the current limiting conductor. At 1214, the opening of the switch at 1211 occurs in response to a charger being connected to the charging node.

At 1215, an electronic device comprises a first device housing coupled to a second device housing by a hinge. At 1215, the electronic device comprises a first energy storage device situated in the first device housing and a second energy storage device situated in the second device housing and electrically coupled to the first energy storage device by a conductor spanning the hinge.

At 1215, the electronic device comprises a charging node at the first device housing that is electrically coupled to the first energy storage device. At 1215, the charging node is electrically coupled to the second energy storage device by the conductor spanning the hinge.

At 1215, the electronic device comprises another conductor spanning the hinge and also coupling the charging node to the second energy storage device. At 1215, the electronic device comprises a switch electrically coupled between the conductor spanning the hinge and the second energy storage device.

At 1215, the electronic device comprises a control circuit coupled to the switch. At 1215, the control circuit opens the switch, thereby allowing a first charging current to flow from the charging node to the first energy storage device through the conductor and a second charging current to flow from the charging node to the second energy storage device through the other conductor. At 1215, the control circuit closes the switch when a difference between a voltage of the first energy storage device and a voltage of the second energy storage device is within a predefined voltage difference threshold.

At 1216, the electronic device of 1215 further comprises a current limiting conductor coupled in parallel with the switch. At 1217, the current limiting conductor of 1216 comprises a resistor serially coupled with the other switch.

At 1218, the control circuit of 1217 closes the other switch when the difference between the voltage of the first energy storage device and the voltage of the second energy storage device exceeds the predefined voltage difference threshold. At 1219, the control circuit of 1218 closes the other switch only the switch is open. At 1220, the conductor and other conductor of 1215 are physically coupled to a flexible substrate spanning the hinge.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
   a first energy storage device coupled to a second energy storage device by a conductor;
   a charging node coupled to the first energy storage device;
   another conductor coupling the charging node to the second energy storage device;
   a switch electrically coupled between the conductor and the second energy storage device;
   a first device housing coupled to a second device housing by a hinge, with the first energy storage device situated within the first device housing, the second energy storage device situated within the second device housing, and the conductor and the another conductor spanning the hinge; and a control circuit opening the switch when a difference between a voltage of the first energy storage device and a voltage of the second energy storage device exceeds a predefined voltage difference threshold and closing the switch when the difference between the voltage of the first energy storage device and the voltage of the second energy storage device is within the predefined voltage difference threshold.

2. The electronic device of claim 1, further comprising a current limiting conductor coupled in parallel with the switch.

3. The electronic device of claim 2, the current limiting conductor comprising a resistor coupled in parallel with the switch.

4. The electronic device of claim 2, the current limiting conductor comprising a resistor coupled in series with another switch.

5. The electronic device of claim 4, the control circuit closing the another switch when the difference between the voltage of the first energy storage device and the voltage of the second energy storage device exceeds the predefined voltage difference threshold.

6. The electronic device of claim 5, the control circuit closing the another switch only when both the difference between the voltage of the first energy storage device and the voltage of the second energy storage device exceeds the predefined voltage difference threshold and the switch is open.

7. The electronic device of claim 1, further comprising a display spanning the hinge.

8. The electronic device of claim 1, the conductor having a predefined impedance, the another conductor having another predefined impedance that is greater than the predefined impedance.

9. The electronic device of claim 1, further comprising a first charging control circuit coupled between the charging node and the first energy storage device and a second charging control circuit coupled between the another conductor and the second energy storage device.

10. The electronic device of claim 9, further comprising a wireless charging terminal coupled to both the first charging control circuit and the another conductor.

11. A method in an electronic device, the method comprising:

opening a switch coupled between a first energy storage device and an electrical conductor coupling the switch to a second energy storage device when a difference between a voltage of the first energy storage device and a voltage of the second energy storage device exceeds a predefined voltage difference threshold, thereby allowing a first charging current to flow from a charging node to the first energy storage device through the electrical conductor and a second charging current to flow from the charging node to the second energy storage device through another electrical conductor; and closing the switch when the difference between the voltage of the first energy storage device and the voltage of the second energy storage device is within the predefined voltage difference threshold to electrically couple the first energy storage device to the second energy storage device with the electrical conductor;

further comprising:

coupling a current limiting conductor in parallel with the switch while the difference between the voltage of the first energy storage device and the voltage of the second energy storage device exceeds the predefined voltage difference threshold and the switch is open;

the coupling comprising closing another switch serially coupled with a resistor, with the another switch and the resistor defining the current limiting conductor.

12. The method of claim 11, further comprising determining whether a power supply is coupled to the charging node.

13. The method of claim 11, further comprising determining whether either of the first energy storage device or the second energy storage device is depleted below a minimum energy storage threshold.

14. The method of claim 11, wherein the opening the switch occurs in response to a charger being connected to the charging node.

15. An electronic device, comprising:

a first device housing coupled to a second device housing by a hinge;

a first energy storage device situated in the first device housing and a second energy storage device situated in the second device housing and electrically coupled to the first energy storage device by a conductor spanning the hinge;

a charging node at the first device housing and electrically coupled to the first energy storage device, wherein the charging node is electrically coupled to the second energy storage device by the conductor spanning the hinge;

another conductor spanning the hinge and also coupling the charging node to the second energy storage device;

a switch electrically coupled between the conductor spanning the hinge and the second energy storage device; and a control circuit coupled to the switch, the control circuit opening the switch, thereby allowing a first charging current to flow from the charging node to the first energy storage device through the conductor and a second charging current to flow from the charging node to the second energy storage device through the another conductor, and closing the switch when a difference between a voltage of the first energy storage device and a voltage of the second energy storage device is within a predefined voltage difference threshold.

16. The electronic device of claim 15, further comprising a current limiting conductor coupled in parallel with the switch.

17. The electronic device of claim 16, the current limiting conductor comprising a resistor serially coupled with another switch.

18. The electronic device of claim 17, the control circuit closing the another switch when the difference between the voltage of the first energy storage device and the voltage of the second energy storage device exceeds the predefined voltage difference threshold.

19. The electronic device of claim 18, the control circuit closing the another switch only the switch is open.

20. The electronic device of claim 15, wherein the conductor and the another conductor are physically coupled to a flexible substrate spanning the hinge.

* * * * *